Figure 10:
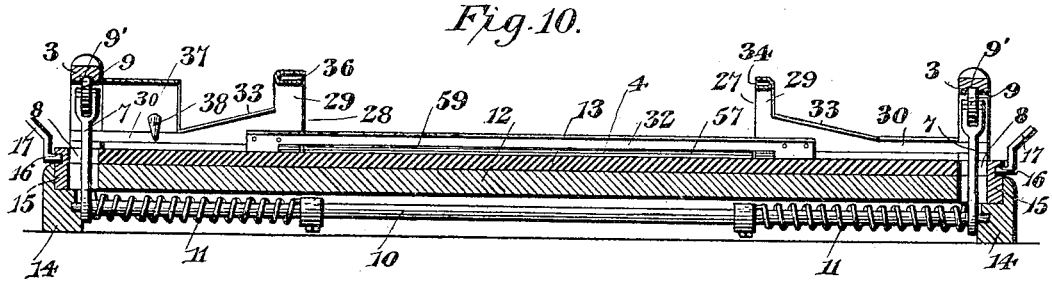

No. 800,507. PATENTED SEPT. 26, 1905.
R. D. STACKPOLE & C. F. LAGANKE.
BILLING PLATEN FOR TYPE WRITING MACHINES.
APPLICATION FILED MAR. 21, 1901.
12 SHEETS—SHEET 1.
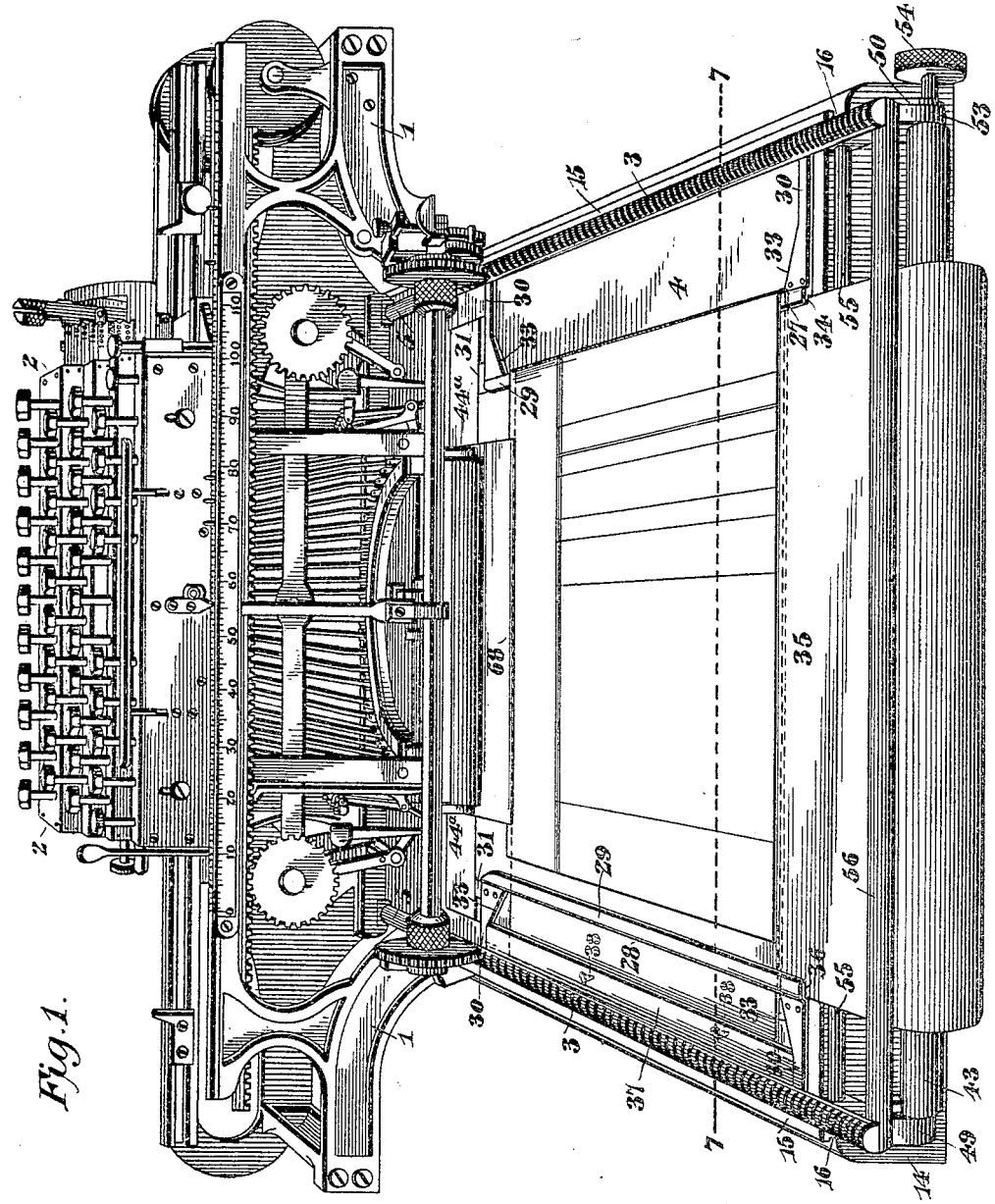

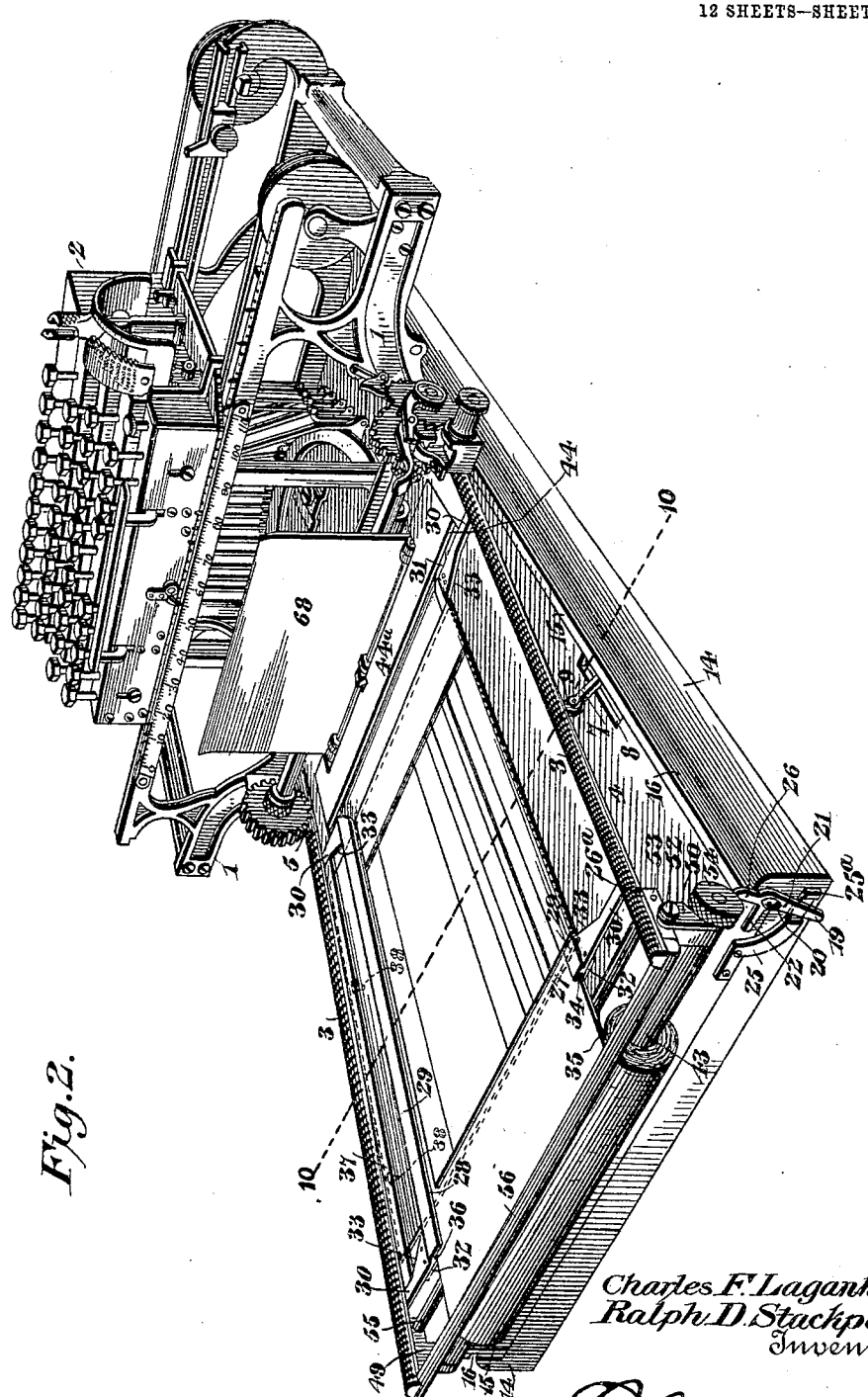

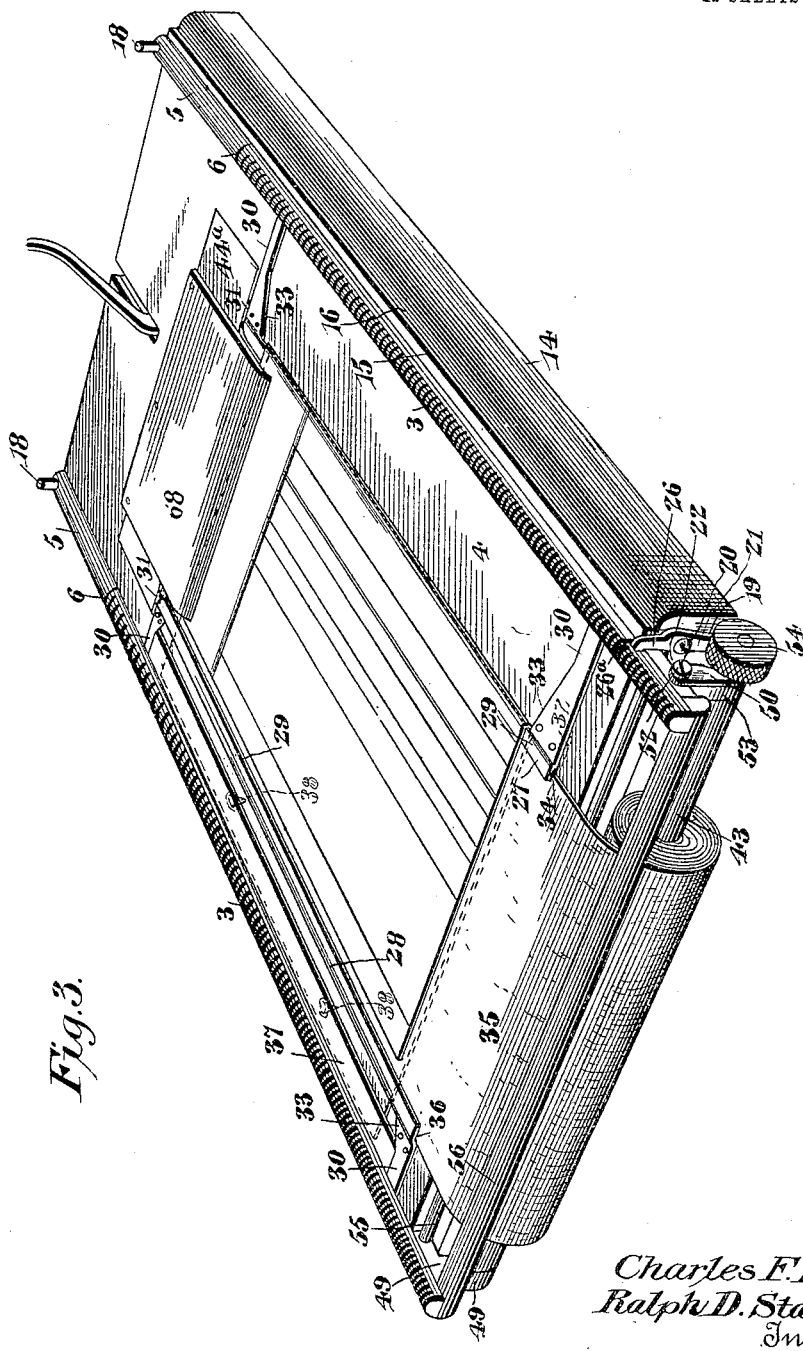

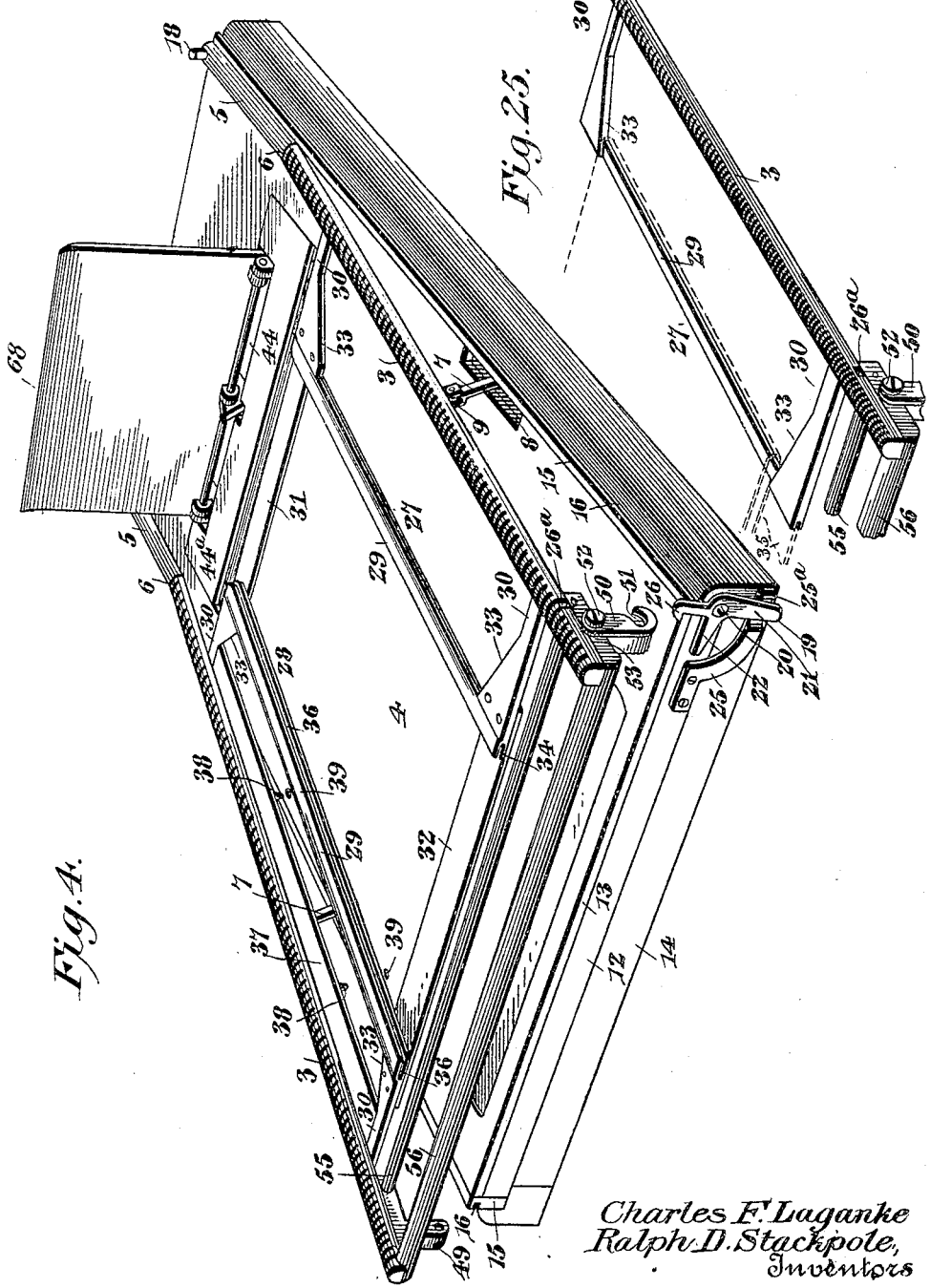

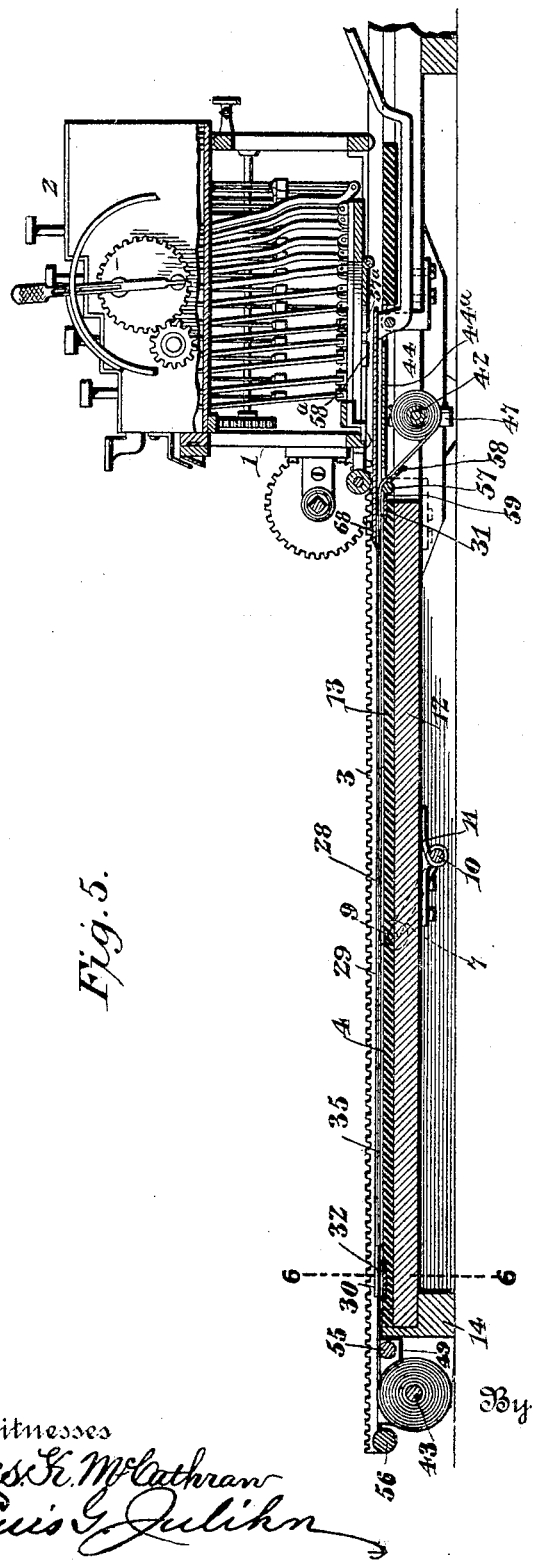
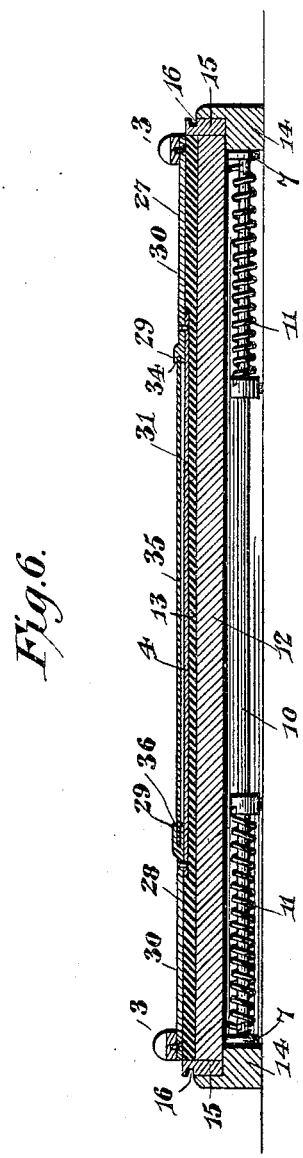

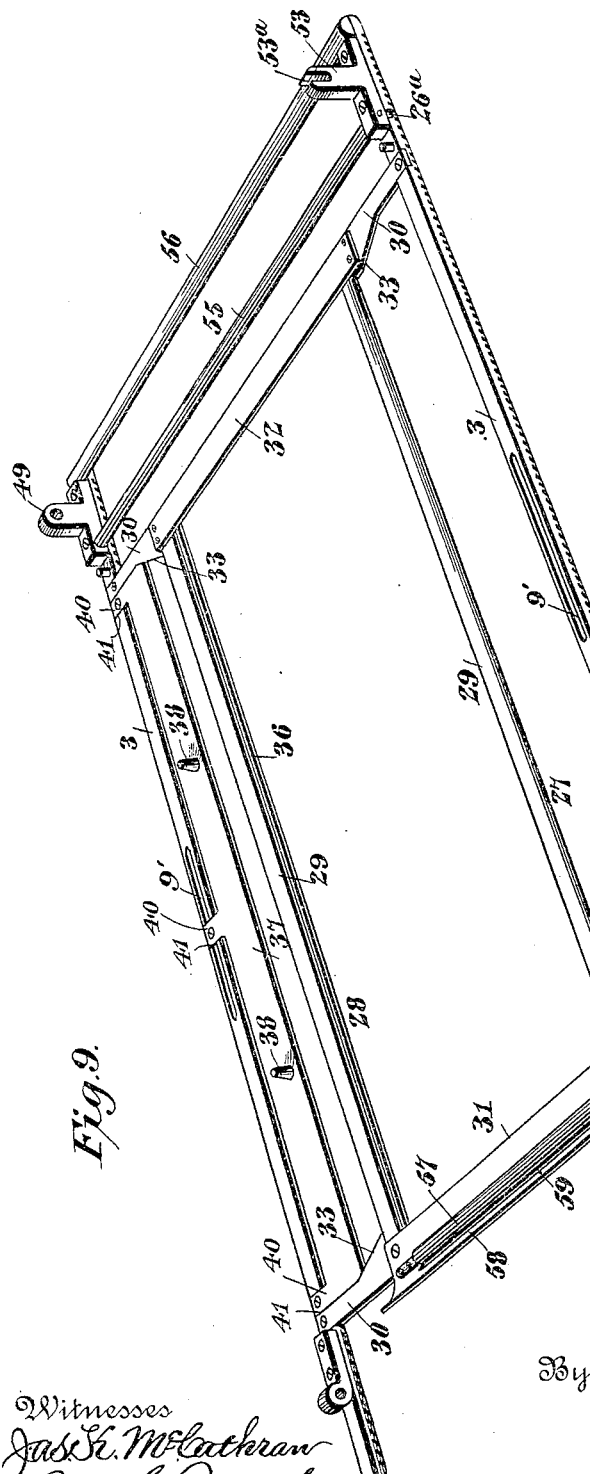

No. 800,507. PATENTED SEPT. 26, 1905.
R. D. STACKPOLE & C. F. LAGANKE.
BILLING PLATEN FOR TYPE WRITING MACHINES.
APPLICATION FILED MAR. 21, 1901.

12 SHEETS—SHEET 7.

Charles F. Laganke
Ralph D. Stackpole
Inventors

Witnesses
Jas. T. McCathran
Louis G. Julihn

By C. G. Siggers
Attorney

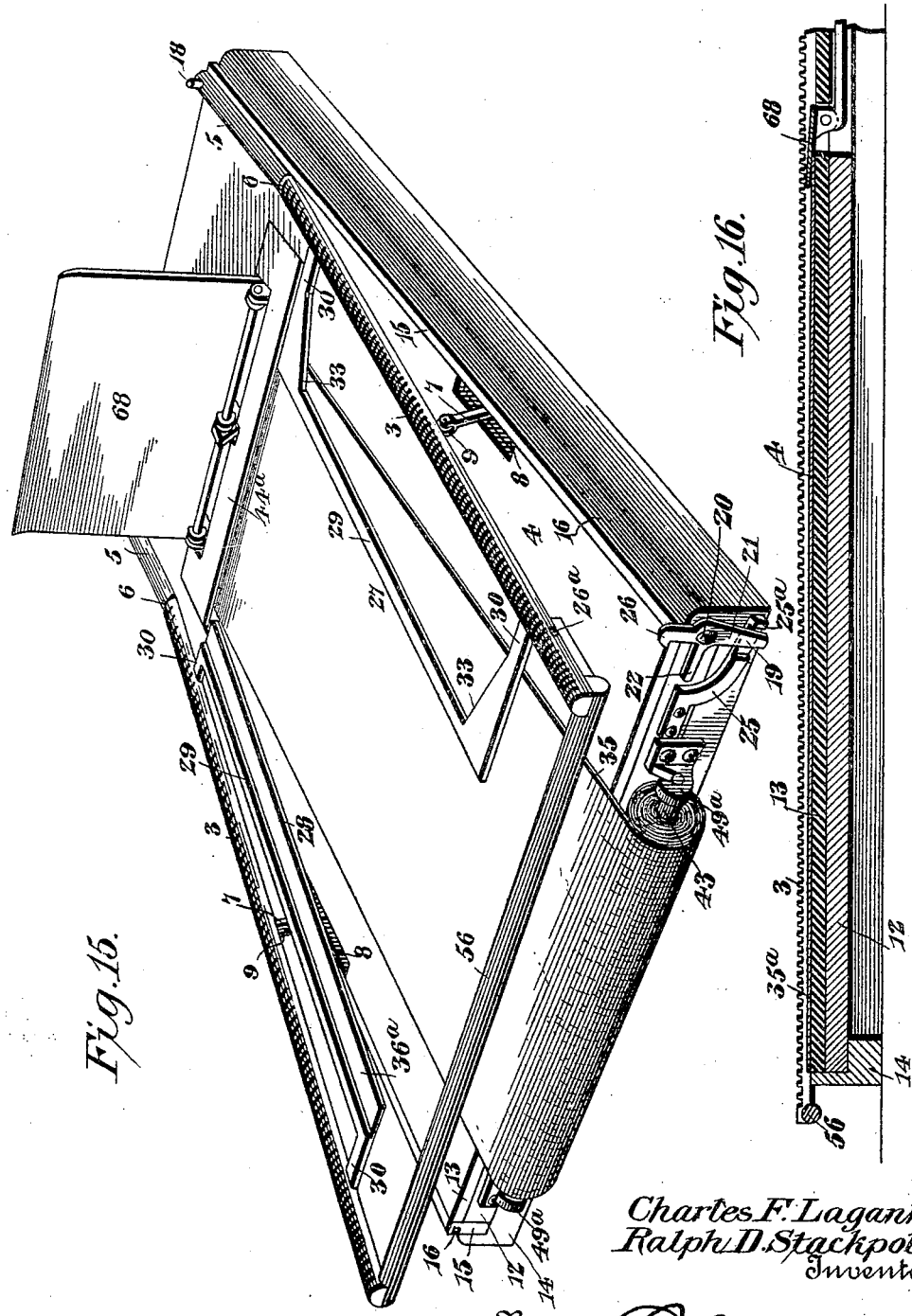

No. 800,507. PATENTED SEPT. 26, 1905.
R. D. STACKPOLE & C. F. LAGANKE.
BILLING PLATEN FOR TYPE WRITING MACHINES.
APPLICATION FILED MAR. 21, 1901.
12 SHEETS—SHEET 9.
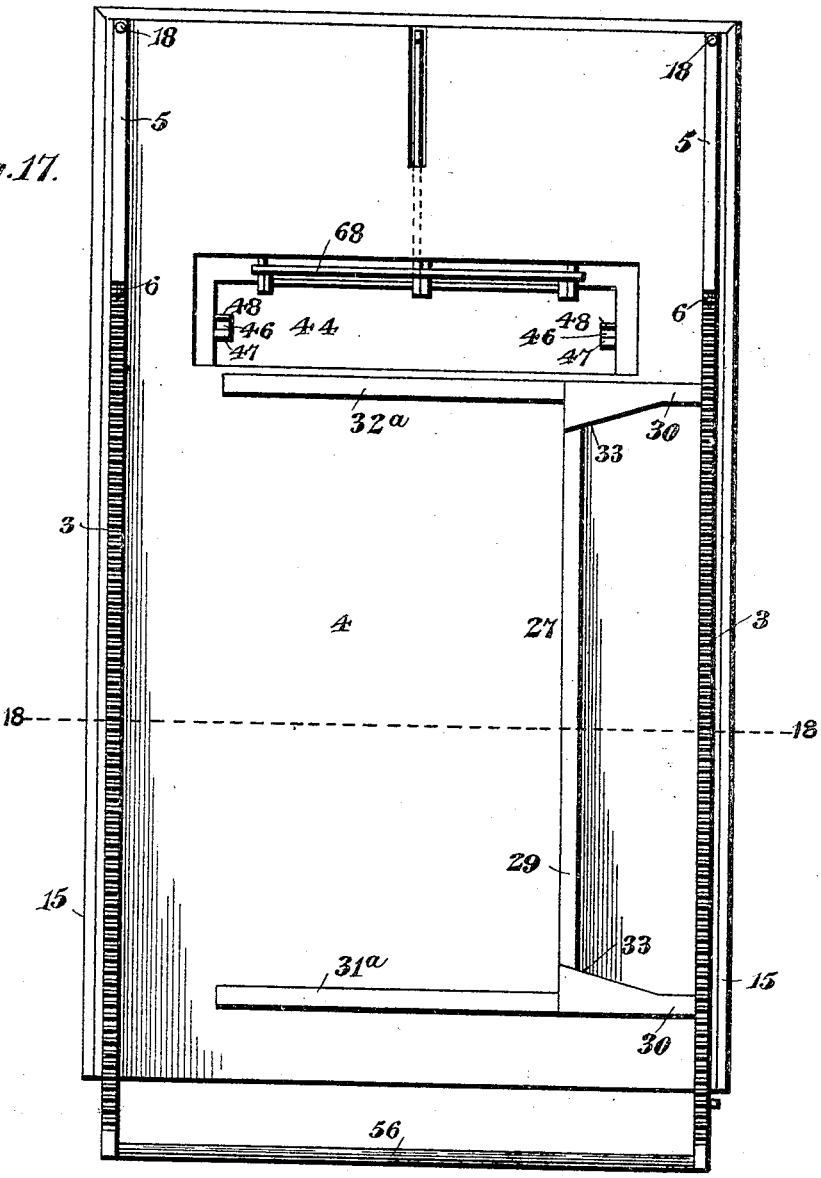
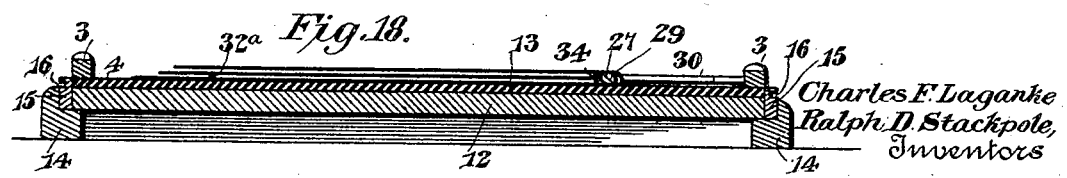

No. 800,507. PATENTED SEPT. 26, 1905.
R. D. STACKPOLE & C. F. LAGANKE.
BILLING PLATEN FOR TYPE WRITING MACHINES.
APPLICATION FILED MAR. 21, 1901.
12 SHEETS—SHEET 10.
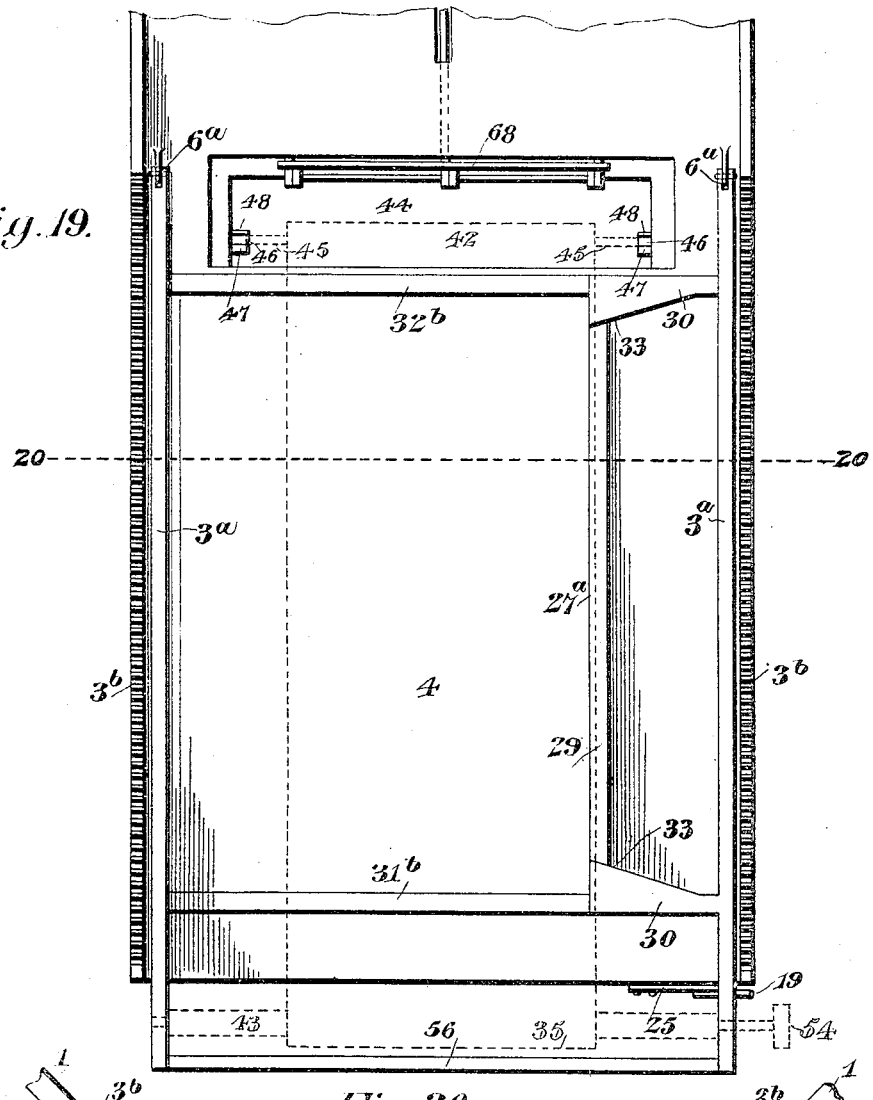
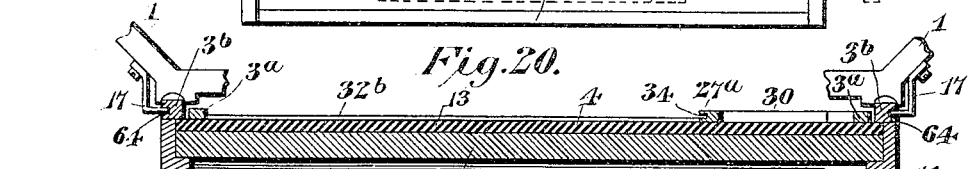
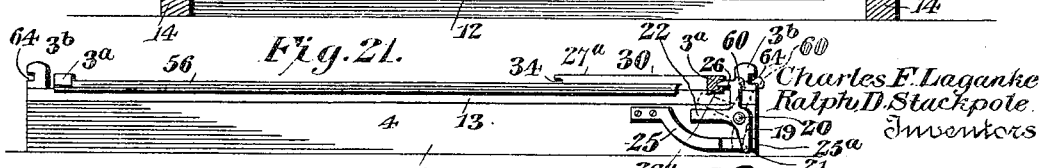

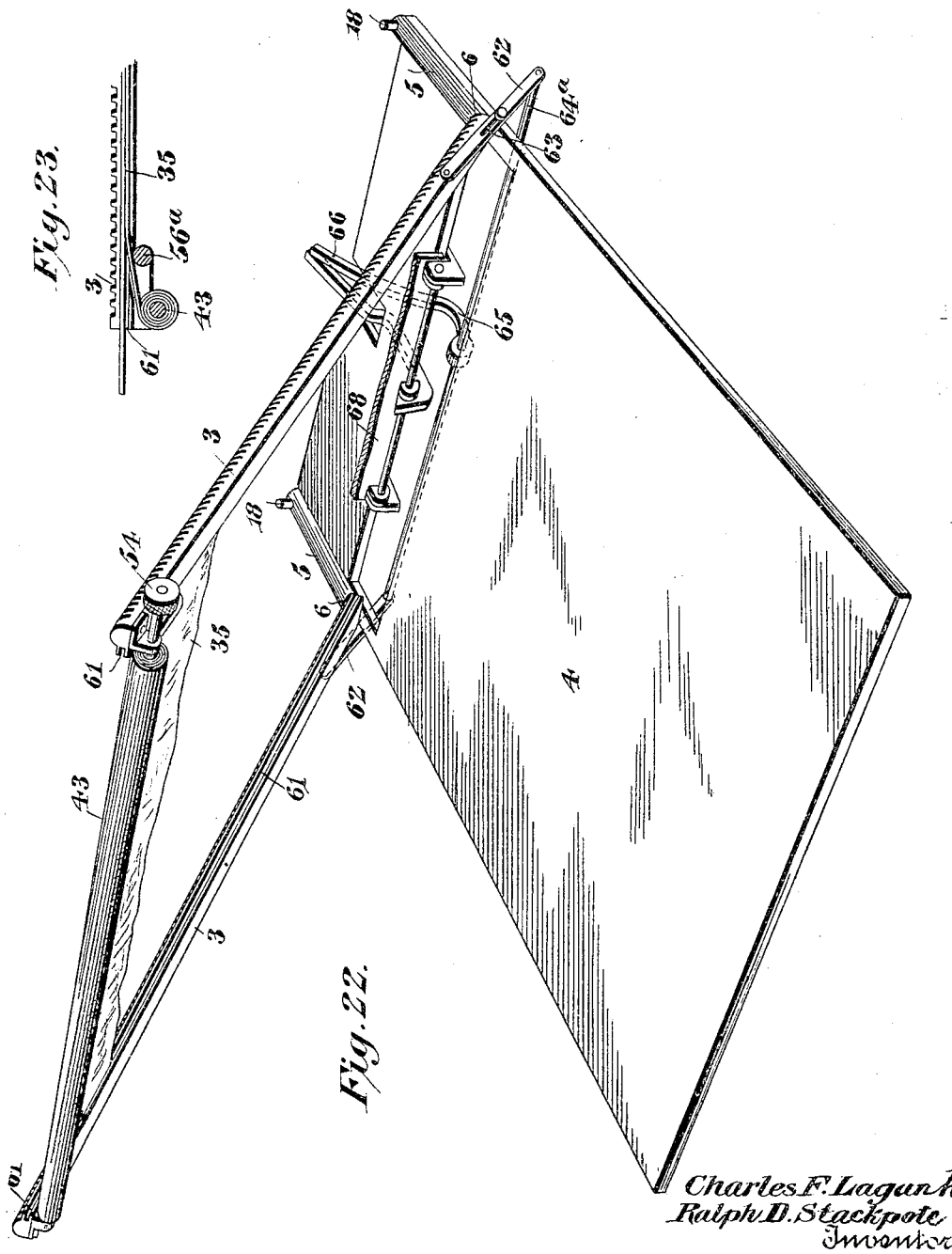

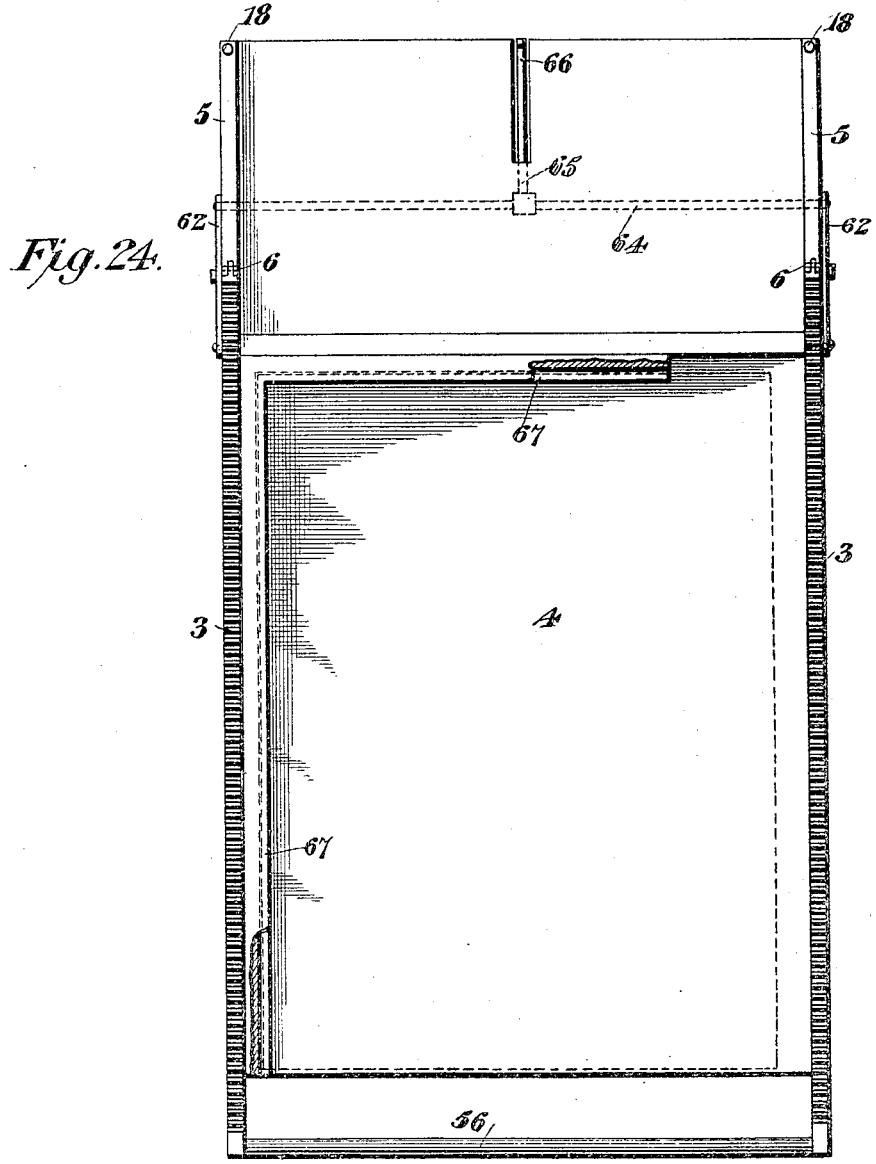

UNITED STATES PATENT OFFICE.

RALPH D. STACKPOLE, OF CHICAGO, ILLINOIS, AND CHARLES FREDERICK LAGANKE, OF CLEVELAND, OHIO, ASSIGNORS, BY MESNE ASSIGNMENTS, TO ELLIOTT-FISHER COMPANY, A CORPORATION OF DELAWARE.

BILLING-PLATEN FOR TYPE-WRITING MACHINES.

No. 800,507.      Specification of Letters Patent.      Patented Sept. 26, 1905.

Application filed March 21, 1901. Serial No. 52,213.

*To all whom it may concern:*

Be it known that we, RALPH D. STACKPOLE, residing at Chicago, in the county of Cook and State of Illinois, and CHARLES FREDERICK LAGANKE, residing at Cleveland, in the county of Cuyahoga and State of Ohio, citizens of the United States, have invented a new and useful Billing-Platen for Type-Writing Machines, of which the following is a specification.

This invention relates to a billing-platen intended more particularly for use in connection with that class of type-writing machines which are adapted to print upon a sheet supported by a flat platen over which the machine moves for letter and line spacing.

The object of the invention, stated broadly, is to produce a platen equipped with improved means facilitating the manipulation, accurate location, and secure retention of the work-sheet or element.

Another object is to adapt the platen for commercial billing, particularly such as involves the use of folded bill-forms now extensively used and comprising upper and lower sheets connected by a fold. In practice the bill is made out on the upper sheet by a suitable recording instrument—as, for instance, a type-writing machine—and a copy of the bill is transferred to the under sheet by an interposed carbon element, the original and copy sheets being subsequently separated by severing the bill-form along the line of the fold. To the attainment of this object the platen is provided with a longitudinal bar or strip, which guards the longitudinal edge of the carbon or transfer element and forms an abutment which is received within the fold or bight of the bill-form.

Another object is to provide means for separating the work-confining device or devices from the platen and for sustaining the same in separated position in order that the hands of the operator may be free to manipulate the sheets in effecting their displacement, replacement, or adjustment. To the attainment of this object the platen is equipped with a reactive mechanism exerting an upward tendency upon the work-confining means and capable of sustaining the latter in its elevated position. In the illustrated embodiment of the invention the work-confining structure includes a swinging machine-supporting frame embodying main tracks or guides which are automatically raised when released—as, for instance, by moving the type-writing machine back beyond the hinges of the frame.

Another object is to provide means for holding the machine-supporting frame in its depressed position independently of the machine. To this end a catch is located at the front end of the platen and engages the frame, so that the latter will not be elevated even when the machine is removed therefrom unless the catch is retracted.

Another object of the invention is to provide the platen with a transfer element and means for automatically separating the same from the platen to facilitate the replacement of the work sheet or sheets without handling the carbon and without danger of mutilating the edge of the transfer element as the work sheet or sheets are placed in position opposite the same. This object is attained by passing a comparatively narrow web of carbon-paper or its equivalent over the writing-surface of the platen and attaching the opposite ends thereof to suitable retaining devices—as, for instance, rolls or carriers, one of which is supported by and movable with the machine-supporting frame.

Another object is to provide guarding or protecting means for that portion of the transfer element or web which extends over the writing-surface of the platen. To this end two bars or strips are extended along the opposite edges of the web, and in the illustrated embodiment of the invention these strips constitute elements of a frame structure connected to the tracks or guides for movement therewith and one of them serving additionally as an abutment for the fold or bight of the bill-form.

Still another object of the invention is to facilitate the proper entry of successive items upon the bill or work sheet at different times. To this end the platen is equipped with alining-guides, which accurately determine the exact position of the form both transversely and longitudinally of the platen.

Still another object is to provide a platen with a work-gage for alining and assisting in holding the work and automatically movable to engage and release the work. To this end a gage-strip provided with gage pins or projections is associated with one side member or track of the machine-supporting or work-confining frame and is automatically raised with the latter.

Other objects subordinate to those stated will hereinafter more fully appear, structural features in addition to those to which attention has been especially directed will be fully described, and the invention in its various aspects will be succinctly defined in the appended claims.

Figure 11:
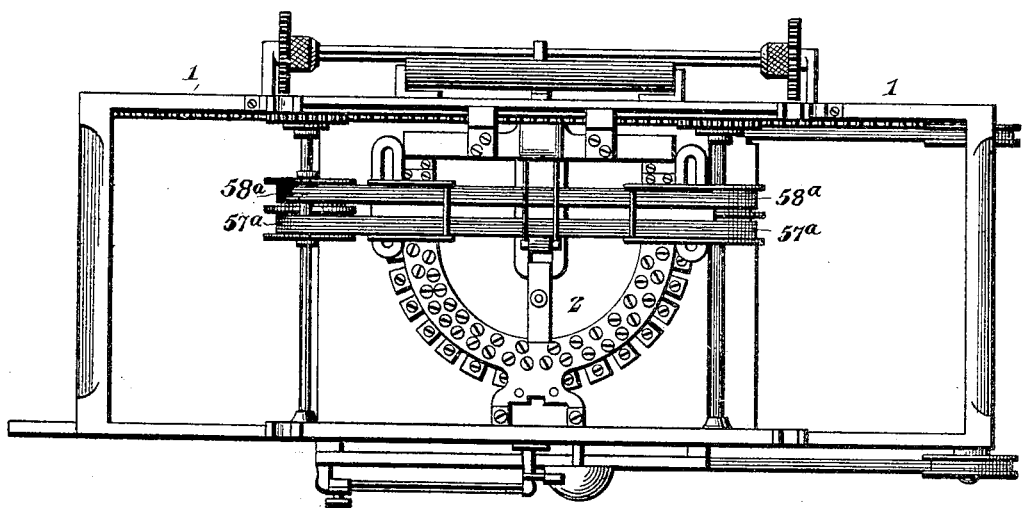
Figure 12:
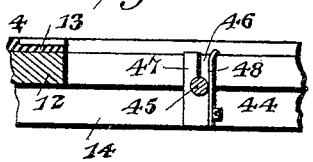
Figure 13:
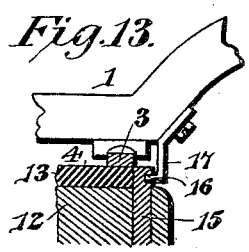
Figure 14:
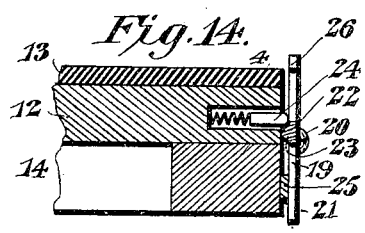

In the accompanying drawings, Figure 1 is a perspective view of a type-writing machine and its platen fitted with the improvements contemplated by the present invention and showing a folded bill in position to be printed upon. Fig. 2 is a similar view with the machine moved back and illustrating the elevated positions which are automatically assumed by the tracks and attached parts. Fig. 3 is a perspective view of the platen, showing the tracks locked in their depressed positions. Fig. 4 is a similar view of the platen with the carbon web and its spools or carriers removed. Fig. 5 is a longitudinal sectional view of the machine and its platen. Fig. 6 is a transverse sectional view on the line 6 6 of Fig. 5. Fig. 7 is a similar view on the line 7 7 of Fig. 1. Fig. 8 is a longitudinal sectional view on the line 8 8 of Fig. 7. Fig. 9 is a detail perspective view of the tracks and the parts carried thereby inverted. Fig. 10 is a transverse sectional view on the line 10 10 of Fig. 2. Fig. 11 is a bottom plan view of the traveling machine, showing the parts which coöperate with the various elements of the platen equipment. Fig. 12 is a detail view showing one of the bearings for the rear carbon-carrier. Fig. 13 is a detail view showing the slidable interlocking connection of the machine-frame with the platen. Fig. 14 is a detail sectional view of the rail-lock. Fig. 15 is perspective view showing a modification in which the carbon element is arranged upon the upper surface of the platen independently of the machine-supporting and work-holding frame to permit the copy to be transferred to the under side of the lower sheet of a folded bill-form. Fig. 16 is a longitudinal sectional view of another modification in which the transfer element may be in the form of an inked cloth or equivalent sheet applied directly to the upper surface of the platen. Fig. 17 is a plan view showing one modification of the work-holding frame. Fig. 18 is a sectional view on the line 18 18 of Fig. 17. Fig. 19 is a plan view of another modification of the work-holding frame and also illustrating another way of preventing upward displacement of the machine-frame. Fig. 20 is a sectional view on the line 20 20 of Fig. 19 and showing a portion of the machine-frame. Fig. 21 is a front elevation of the construction shown in Fig. 19, showing the work-holding frame locked down and indicating in dotted lines the released position of the lock. Fig. 22 is a perspective view, illustrating an arrangement of work-holding frame specially adapted for billing when the copy is to be transferred to the page of a book. Fig. 23 is a detail sectional view of a portion of the work-holding frame shown in Fig. 22. Fig. 24 is a plan view of a modified frame for a single sheet and a loose carbon, and Fig. 25 is a detail perspective view of a modification of the right-hand member of the work-holding frame shown in Fig. 4.

In its broader aspect the present invention is not limited to type-writing-machine platens, since various features of the novel construction are possessed of special utility regardless of the particular type of recording instrument with which the original record is made. The present embodiment of the invention, however, is especially adapted for use in connection with what is known as a "flat-platen type-writer" designed for billing and book work.

The particular machine selected for illustrative purposes is the Elliott-Fisher typewriter of commerce. This machine is exemplified in Patent No. 573,868 to R. J. Fisher, and includes as primary elements a flat platen 4, upon which a leaf, sheet, bill-form, or other work element is supported in a flat or spread-out condition, and a traveling machine-frame 1, movable over the platen for line-spacing, and a carriage 2, carrying the printing mechanism and movable on the machine-frame for letter-spacing. The machine-frame 1 travels upon the tracks or guides 3, connected at their front ends to form a machine-supporting frame, which is hinged at its rear end, as indicated at 6, and is movable toward and from the platen. In rear of this frame are fixed track-sections 5, which constitute a support for the machine when the latter is moved back beyond the hinges of the machine-supporting frame to permit the elevation of the latter.

In that form of the invention illustrated in the first fourteen figures of the drawings the work-holder or work-holding frame is disposed over the platen between the tracks or guides 3, and consists of a pair of frame members 27 and 28, associated with the tracks 3, with which they are movable toward and from the platen. This swinging structure may be variously viewed as a vertically-movable machine-supporting frame, a movable work-holder, or a combined machine-supporting and work-holding frame. The present improvement of the platen equipment also contemplates the provision of means for moving the swinging machine-supporting frame and its attached parts away from the platen. While this end may be attained in a variety of ways, it may be preferable to provide for the automatic elevation of the frame when the machine is moved back beyond the hinges 6 onto the fixed sections 5 of the tracks. To this end lifting-arms 7, projecting from a rock-shaft 10, are passed upwardly through slots 8 in the platen and are provided at their free ends with rollers 9, which bear against the under sides of the tracks 3, which are preferably provided with longitudinal grooves or recesses 9' for their reception. The shaft 10 is journaled in suitable bearings beneath the platen and has coiled thereon a pair of springs 11, which tend to rotate the shaft in a proper direction to move the arms 7 upwardly. In the illustrated embodiment of the invention the force exerted by the springs is sufficient to cause the automatic elevation of the swinging structure when the machine is moved back beyond the hinges; but, if desired, the springs 11 may be of only sufficient strength to substantially balance the frame, and thus facilitate the manual elevation thereof by the operator. The platen 4 comprises a base 14, in which is seated a metallic or other body 12, having applied to its upper side the usual writing-surface 13. At its opposite side edges the platen is provided with fixed guard-rails 15, having their upper edges flush with the writing-surface of the platen and formed in their outer faces with longitudinal guide-grooves 16, which slidably receive retaining gibs or keys 17, fitted to the lower bar of the traveling machine-frame 1 at the front side thereof. These gibs or keys not only serve to assist in properly guiding the machine in its movement over the platen, but also afford an interlocking connection which prevents displacement of the machine and of the tracks upon which the machine is imposed. To prevent the machine-frame from sliding off at either end of the platen, front and rear machine-stops are provided. The rear stops 18 are of usual form and are located at the rear extremities of the fixed track-sections 5. The front stop may be of the same character, but is preferably movable into and out of operative position. In the illustrated construction the upper end of a lock or latch 19 constitutes the front machine-stop; but this function is subordinate to its primary function as a locking device for holding the swinging structure, including the machine-supporting frame and associated parts, in its depressed position. The lock or latch 19 (shown in Figs. 2, 3, 4, and 14) is in the form of a bell-crank lever, pivoted at 20 to the front end of the platen contiguous to one of the guard-rails 15 and having a pendent handle 21 and a laterally-projecting holding-arm 22. The arm 22 is provided with a V-shaped side 23, with which coöperates a spring-urged plunger 24, seated in the front edge of the platen and serving to retain the lock or latch in either of its positions. The handle 21 of the latch is movable over a wear-plate 25, fixed to the platen and having stops 25$^a$, disposed to limit the movement of the handle. Projecting upwardly from the lock 19 is what may be termed the "locking-hook" 26, which in one position engages a notch 26$^a$ in the outer side face of one of the swinging tracks to lock the swinging structure down upon the platen. It is this locking-hook 26 of the lock or latch 19 which performs the additional function of a front machine-stop, and obviously it may be moved into or out of interfering position, so that the machine may be arrested at the front end of the platen or removed therefrom, according to the position of the stop. We have now seen that the work-holder is associated with the swinging machine-supporting frame and that while normally retained in its depressed position, either by the latch 19 or by the superposed machine, it will be automatically raised, unless held by the latch, when the machine is moved back onto the fixed sections of the tracks. Before describing the work-holder in detail it may be stated that this embodiment of the invention—to wit, that shown in the first fourteen figures—is specially intended for billing purposes, and more particularly in connection with folded bill-forms, comprising an upper work-sheet and a lower copy-sheet connected by a longitudinal fold or bight. The work-holder to be described is intended to facilitate the accurate location and retention of the bill-form upon the platen and to facilitate the use of a carbon or transfer element which is interposed between the upper and lower sheets of the bill.

Each member 27 and 28 of the work-holding frame comprises a metal strip disposed longitudinally of the platen and short end bars 30, connecting the opposite ends of the strip with the adjacent track or side of the machine-supporting frame, the structure being further stiffened by transverse end plates 31 and 32, located at the front and rear ends of the frame and fixed to the under side of the bars 30 of the members 27 and 28. The platen is recessed, as shown, for the accommodation of the end plates in order to permit the strips or bars 29 to rest directly upon the writing-surface of the platen or upon the work, as the case may be.

The folded bill-form, in connection with which the present invention is especially useful, as stated, usually has a line of perforations extending along the bight or fold to facilitate the separation of the sheets. As the fold is usually located at the right-hand edge of the form, the latter is slipped into place upon the platen, with the longitudinal strip 29 of the right-hand frame member located within and constituting an abutment for the fold or bight of the bill. Entries are made upon these bills or forms from time to time to record the transactions of running accounts and at the end of the month or other period are totalized, the bill being detached and forwarded to the customer and the copy-sheet being retained for reference. The rapid manipulation of a large number of these bills by the operator for the purpose of recording sales items requires the exercise of skill, for the reason that a bill-form repeatedly placed upon the platen must always occupy the same position to insure the proper spacing of the lines of writing and the accurate alinement of the columns of numbers. Accurate alinement of the bill as to its transverse position is insured by the abutment or strip 29, and the accurate location of the bill longitudinally of the strip is insured by the end bars 30, either of which constitutes an alinement-guide bearing an angular relation to the strip and disposed to engage one end of the bill. The bars 30 of each frame member are preferably provided with inwardly-convergent inclined alining edges 33. It will thus be seen that the bill may be repeatedly slipped to place upon the platen for the purpose of entering individual items thereon from time to time and that it will always occupy the same printing position without necessitating a sacrifice of speed to secure accuracy of alinement. The longitudinal strip 29 of the right-hand frame member 27 is preferably made hollow by providing its inner edge with a longitudinal guide-groove 34, which receives and guides the adjacent edge of a transfer element or web 35, of any suitable material, which is led over the platen longitudinally. The transfer element is interposed between the upper and lower sheets of the bill-form when the latter is in place, and its left-hand edge rests and slides within a somewhat deeper guide-groove 36 in the strip 29 of the other or left-hand frame member 28. The edges of the transfer element or carbon-web are thus supported, guided, and guarded by the longitudinal strips or bars of the frame, and the web is therefore raised from the platen when the frame is elevated, guided in its proper path when advanced to present an unused portion of the carbon in position, and protected from mutilation by contact with the edge of the work-sheet when the latter is slipped into position for use. It may be remarked at this point that, so far as its function as a carbon-guard is concerned, the right-hand guide-strip 29 need not support or guide the carbon, since it is evident that this strip constitutes guarding or protecting means for the edge of the carbon, even though the latter is not of sufficient width to be either supported or guided thereby. In such event the strip 29 being disposed opposite the edge of the carbon would prevent the latter from being engaged and mutilated by the edges of the bill-form when the latter is slipped into place. The left-hand strip 29 is preferably somewhat wider than the right-hand strip in order to more surely prevent the transfer element from being drawn down and off of the frame as the latter is raised and lowered. It will now be noted that the swinging work-holding frame supports the work element, holds the same in the printing position, and carries it away from the platen when the frame is elevated. This frame may therefore be variously considered a work-holder, a work-support, or a work-carrier. This frame will also be seen to embrace means for alining the work both longitudinally and transversely of the platen and for holding, supporting, guiding, and guarding a transfer element or web.

Associated with the work-holding frame described is a work-gage movable therewith toward and from the platen to engage and release the work. In that embodiment illustrated in the first fourteen figures of the drawings (see particularly Figs. 1, 3, 4, 7, 8, and 9) the work-gage includes a gage-plate 37, disposed along the inner side of the left-hand track 3 and provided with a pendent gage-abutment in the form of alined gage projections or pins 38, which when the frame is depressed are loosely seated in receiving-sockets 39, formed in the upper surface of the platen. These gage-pins pass through marginal file-holes in the work-sheet when the frame is depressed, and thus additionally secure the sheet to prevent the possibility of its twisting or slipping out of its proper printing position when the printing mechanism is operated thereover. The number of pins 38 employed will depend, of course, upon the number of file-holes in the work-sheet. The under side of the gage-plate 37 is flush with the under side of the adjacent track 3, to which it is secured by laterally-extending lugs 40, secured to the track and received within recesses in the under surface thereof. Thus when the frame is depressed the gage-plate will lie flat upon the edge of the work engaged by the gage-pins.

The material, form, and mounting of the transfer element 35 may be varied within wide limits. In that form of the invention now being described, however, this element is a long comparatively narrow web of carbon-paper, the opposite ends of which are wound upon carbon carriers or spools 42 and 43, arranged beyond opposite ends of the work-holding frame and led longitudinally over the printing area of the platen, where it is supported, guided, and guarded in the manner heretofore described. The rear spool or carrier 42 and the roll of carbon wound thereon are housed within a pocket 44, formed in the platen, and are protected from dust by a cover-plate 44$^a$, covering the pocket and flush with the writing-surface. The carrier 42 is provided with short spindle extremities 45, which rotate in open bearings 46 in the bearing-posts 47 at opposite ends of the pocket 44. Spring-clips 48, secured at their lower ends to the posts 47, normally bear against the spindle extremities of the carrier 42 and besides acting as a brake for the carrier serve to prevent accidental displacement thereof, but yield to permit the withdrawal of the carrier when necessary. This spool or carrier 42 supports the unused roll of carbon-paper, the used or worn-out portion of which is wound upon the front spool or carrier 43. The carrier 43 is supported by and movable with the front end of the swinging work-holding and machine-supporting frame.

Fitted to one of the tracks 3 adjacent to its front end is a fixed pendent bearing 49, and in a corresponding position on the other track is a similar bearing member or block 53, provided with a recess $53^a$, within which a spindle extremity of the carrier 43 is detachably retained by a swinging bearing member or hook 50, which engages the spindle extremity projecting beyond the block. The pivot-screw 52 of the member 50 may be tightened to hold said member in fixed position. When the detachment of the front carbon carrier or spool 43 is desired, it is simply necessary to loosen the screw 52, when, as will be obvious, the hook 50 may be swung back and the carrier released. To facilitate the rotation of the front carbon-carrier and the winding of the used carbon thereon, one of its spindle extremities is equipped with a thumb-wheel or feeding-knob 54, as shown.

To assist in guiding the carbon-web, a guide-roller 55 is located parallel with and contiguous to the front carrier 43 and is preferably journaled in the bearing-blocks 49 and 53, as shown, a similar roller 57 being located adjacent to the front edge of the spool-pocket 44 and also movable with the frame. To provide a mounting for this roller 57, the rear end plate 31 is preferably widened to form a roller-guard 58, which is curved downwardly into the pocket 44 and has a longitudinal slot 59, through which a portion of the periphery of the roller 57 is exposed to the carbon element. Secured to the under side of this guard are bearings in which the ends of the roller 57 are journaled, said roller being located at that point where the carbon-web leaves the plane of the writing-surface and passes downwardly into the spool-pocket, thus preventing mutilation of the carbon at that point.

It may be observed at this point that while the novel platen equipment disclosed herein has been especially devised for use in connection with folded work-sheets upon which the original record is type-written it is to be distinctly understood that the invention is not limited to the use of any special recording instrument or to any particular form of work-sheet. For instance, the arrangement for manifolding is possessed of distinct utility regardless of the character of the recording instrument, which instead of a type-writing machine may be a pen, pencil, stylus, or other suitable device. Similarly the described arrangement facilitates manifolding in connection with separate sheets, although particularly adapted for the use of folded forms embodying connected original and copy sheets. Moreover, attention is directed to the fact that the work-holder is possessed of novelty and utility aside from its association with either the machine-supporting frame or the particular character of transfer means disclosed and that similarly the arrangement of the transfer-web is new and useful regardless of the work-holding and machine-supporting frame, with both of which it is shown associated in a single vertically-movable structure. This latter statement may be better understood by regarding the swinging supporting structure merely as a means for raising and lowering the carbon, so that during the recording operation the transfer element will lie close to the platen and will be automatically raised or separated from the latter or from an underlying sheet or sheets when the displacement, replacement, or adjustment of the work is desired. In this aspect it is immaterial whether or not the means for elevating the carbon performs additional functions, and it is likewise immaterial what instrumentalities are employed for retaining the ends of the carbon or what particular character of retaining means for the work sheet or sheets is employed.

To meet the requirements of commercial billing, the type-writing machine, when such is employed, is preferably equipped with ribbons $57^a$ and $58^a$ (see Fig. 11) of different colors, usually black and red. This, however, constitutes no part of our present invention, but is mentioned incidentally.

While, as already stated, the work-holding frame not only serves to support the bill or sheet, but also to sustain and guide the carbon element or web, the latter may be mounted independently of said frame, so that it will remain in position adjacent to the writing-surface of the platen when the frame is raised. This modified arrangement is shown in Fig. 15 of the drawings, wherein the journals of the front carbon-carrier 43 are mounted in fixed bearing-lugs $49^a$, projecting from the front end of the platen. Thus both the front and rear carbon-carriers or carbon-retaining devices are supported by the platen, and the transfer element or web, while shiftable longitudinally to present unused portions thereof opposite the writing-surface, is not movable vertically with the work-holding frame. In using a folded bill-form with this construction the carbon is not interposed between the upper and lower leaves of the bill, but is disposed under the lower leaf, to the under side of which the copy of the original record is transferred. To avoid the inconvenience of reading a reverse or negative record, the under sheet of the bill-form may be made transparent. In this particular character of billing the shiftable carbon element or web may be substituted by an inked cloth or equivalent transfer material applied to the upper surface of the platen, as shown in Fig. 16 of the drawings, or, in fact, a loose carbon-sheet may be employed in lieu of either the continuous web or the inked cloth and may be inserted either between the sheets of the bill or under the copy-sheet. Another variation, disclosed in Fig. 15, consists in substituting for the guide-groove 36 a comparatively wide supporting-ledge for the reception of the left-hand longitudinal edge of the transfer-web or for the edge of the bill-form or other work-sheet in those constructions which contemplate the elevation of the work-frame independently of the transfer element.

Various modifications of the work-holding frame are contemplated. For instance, as shown in Fig. 15, the end bars 31 and 32 are omitted, so that the frame members 27 and 28 are not connected, although they are carried by a single swinging structure comprising the tracks 3 and the front connecting-bar 56, constituting the machine-supporting frame. In Figs. 17 and 18 of the drawings is shown a modified arrangement which omits the left-hand frame member 28, but includes supporting arms or extensions $31^a$ and $32^a$, extending from the opposite ends of the right-hand member 27 and corresponding in general function and location to the end plates 31 and 32 of the construction first described. It will be noted that in this construction provision is still made for supporting and guiding the carbon as well as for locating and sustaining the work element. In the modification shown in Figs. 19 and 20 of the drawings the work-holding frame is of skeleton form and comprises longitudinally-disposed vertically-swinging members $3^a$, mounted independently of but adjacent to the tracks or guides $3^b$. These members $3^a$ are connected at their front ends by a transverse bar $56^a$, and to one of them—to wit, the right-hand longitudinal member—is joined the open frame member $27^a$, corresponding to the member 27, heretofore described. From the opposite ends of this member $27^a$ extend transversely of the platen the supporting-arms $31^b$ and $32^b$, connected at their left-hand ends to the adjacent longitudinal member $3^a$. In this form of the invention the tracks $3^b$ may remain stationary and serve merely as supports for the traveling machine. This skeleton frame is hinged to the platen, as at $6^a$, and is designed to be elevated when the machine is moved back beyond the hinges. In that form of the invention shown in Figs. 19, 20, and 21 of the drawings the lock or latch 19 coöperates with one of the members $3^a$ of the work-holding frame; but in order that it may also constitute a front stop for the machine-frame, as in the previously-described constructions, it is provided with a stop-arm 60, adapted in one position of the lock or latch to be located in the path of movement of the machine-frame or a part carried thereby. In these figures will also be noted a variation of the means for preventing upward displacement of the machine-frame. This variation consists in having the keys or gibs 17 engage with the tracks $3^b$ instead of with the guard-rails, as before, said tracks being provided with grooves or ways 64 for the reception of said keys.

In Fig. 22 of the drawings is shown a modified structure especially adapting the invention for use in connection with a single sheet instead of a folded form and for the transference of the copy of the bill to the page of a book. In this form of the invention a comparatively thin platen, such as is used in connection with certain of the Elliott-Fisher type-writing machines, is designed to be slipped beneath the page of a book in the usual manner. The vertically-movable workholding frame may consist simply of the vertically-swinging tracks 3, connected by the cross-bar $56^a$. The side members or tracks of this frame are provided with one or more longitudinal guideways 61 for the edges of the bill or sheet and also for the edges of the carbon element or web. Obviously, however, this frame may be constructed as shown in Fig. 1, if preferred. In bookwork it is necessary to have the platen substantially unobstructed, at least for the greater portion of its length, and in this form of the invention the means for lifting the frame is accordingly modified. While various expedients for this purpose may be resorted to, a simple and efficient arrangement consists in providing a pair of swinging lifting-arms 62, connected at their front ends to the tracks 3 and having slidable connections 63 with the side edges of the platen. The rear ends of the arms 62 are connected by a bar or rod $64^a$, disposed transversely below the platen and connected to the lower end of an operating lever or cam 65, the inclined rear end 66 of which projects above the surface of the platen at or adjacent to its rear end and is thus disposed in the path of the traveling machine. When the machine is pushed back upon the rear end of the platen, the frame thereof engages the cam-arm 66 and depresses the latter, the weight of the machine being considerably greater than that of the swinging structure. The depression of the cam-arm will obviously cause the lifting-arms 62 to elevate the frame. When the machine is again moved forward, the swinging frame structure will drop back upon the page of the book imposed upon the writing-surface of the platen. Obviously either a single work-sheet or a folded form may be employed in connection with the construction shown in Fig. 22, and while the frame is shown equipped with a carbon-carrier it is possible to employ a loose carbon element, if desired.

A modification especially designed for use in connection with a loose transfer-sheet is shown in Fig. 24. To the left-hand side of the rectangular frame is fitted an L-shaped alining-guide 67, having a groove along its inner edge to receive the edge of a bill or sheet to accurately aline the same. The loose carbon element is slipped between the bill or sheet and the underlying page or copy-sheet, to which the record is to be transferred. It may be noted in passing that in connection with those forms of the invention shown in Figs. 22, 23, and 24 of the drawings, and more particularly in Fig. 22, the printed matter or record may extend much closer to both margins of the work element than is possible when the sheet is held under one or both of the tracks in the ordinary manner.

In Fig. 25 of the drawings (Sheet 4) a further variation of the work-holding frame is shown. This variation consists in making the end bars 30 of the right-hand frame member 27 slightly thicker than the guide-strip 29, so that they project above the upper surface of the latter. These projections constitute a stop or abutment against either of which the upper or lower edge of the sheet is arrested. This variation, though slight, is possessed of considerable utility, for the reason that in the frequent handling of folded bill-forms the leaves or sheets thereof are apt to become separated at one or both ends of the fold, which is weakened by a line of perforations, as heretofore stated. In the event of such mutilation, these stops or abutments engaging one or both ends of the bill assist greatly in retaining the latter in its properly-alined position.

In certain figures of the drawings is shown a machine-operated work-clamp 68, pivotally-mounted upon the platen and arranged to clamp the top edge of the sheet for the purpose of guarding and protecting the latter as the machine is moved toward and away from the printing area. This clamp constitutes no part of our invention and is illustrated merely to show a desirable form of guard or protector for the sheet. It is the invention of Robert J. Fisher and is claimed in Patent No. 747,948.

While the present application discloses a work-holder or work-holding means movable toward and away from the writing-surface of the platen and also means for moving the work-holder, the invention in these broad aspects is not claimed herein, but was disclosed and claimed in the copending application, Serial No. 22,206, of Hiram J. Halle, which has eventuated in Patent No. 737,735, dated September 1, 1903. Furthermore, although one form of the invention illustrated in the drawings embraces a flat platen, main tracks or guides, and a work-holder movable independently thereof toward and away from the writing-surface and having supporting means for the sheet to be printed on and also for the carbon element or web, this special structure is not claimed herein, the same being the invention of Fisher and Stackpole and claimed in their copending application which has eventuated in Patent No. 705,524, dated July 22, 1902. So, also, the construction shown in Fig. 22 of the drawings, while embraced within the scope of the subjoined claims, is not specifically claimed herein, since the same is the invention of Hiram J. Halle. Attention is also directed to the fact that, as regards certain aspects of the invention, it is immaterial whether a type-writing machine or some other recording instrument is employed in connection with the platen; also, that when a type-written record is desired it is immaterial what particular type or class of type-writer is utilized or in what manner the relative movement of the work-sheet and printing mechanism is secured to provide for letter and line spacing—that is to say, it is immaterial whether the printing mechanism or the flat, cylindrical, or other form of platen is movable to secure letter and line spacing or whether one is movable for line-spacing and the other for letter-spacing.

It is believed that the foregoing description is sufficient to enable those skilled in the art to fully comprehend the invention. It should be understood, however, that while certain variations of the preferred construction have been indicated many other modifications thereof are possible, and we therefore expressly reserve the right to effect such changes, modifications, and variations of the illustrated structures as may come fairly within the scope of the protection prayed.

What we claim is—

1. In a type-writing machine, the flat platen, and the work-holder arranged over the platen and provided with holding means for the sheet to be printed upon and also for a carbon element or web.

2. In a type-writing machine, the flat platen, and the work-holder arranged over the platen and provided with means for holding and guiding the work-sheet and a shiftable carbon-web.

3. In a type-writing machine, the flat platen, and a work-holder having means arranged over the platen for holding a carbon-web, and also a folded sheet with the separate leaves thereof disposed above and below the carbon-web.

4. In a type-writing machine, the platen, and a support for the edge of a carbon-sheet, said support being disposed to form an abutment for the folded edge or bight of the bill or work sheet.

5. In a type-writing machine, the platen, and a movable support for the edge of a carbon-sheet, said support being disposed to form an abutment for the folded edge or bight of the bill or work sheet.

6. In a type-writing machine, the platen, a movable support for the edge of the carbon-sheet, said support being disposed to form an abutment for the folded edge or bight of the bill or work sheet, and means for moving said support away from the platen.

7. In a type-writing machine, the platen, and an automatically-movable support for the edge of a carbon-sheet, said support being disposed to form an abutment for the folded edge or bight of the bill or work sheet.

8. In a type-writing machine, the work-holder adapted to occupy a position beneath the printing mechanism, and movable from the writing-surface, said work-holder being provided with holding means for the sheet to be printed upon, and also for a carbon element or web.

9. In a type-writing machine, a work-holder adapted to occupy a position beneath the printing mechanism, and movable to and from the writing-surface, said work-holder being provided with means for holding in operative relation the sheet to be printed upon and a carbon element or web.

10. In a type-writing machine, a vertically-swinging work-holder adapted to occupy a position beneath the printing mechanism, and provided with means for holding and guiding the work-sheet and a shiftable carbon-web.

11. In a type-writing machine, the flat platen, a work-holder adapted to occupy a position beneath the printing mechanism, and provided with means for holding the sheet to be printed upon and a carbon element, and means for laterally alining the work.

12. In a type-writing machine, the combination with a flat platen and the main tracks or guides for the traveling machine, of a work-holder arranged over the platen, and carrying means located between said tracks or guides and over the platen for laterally alining the sheet.

13. In a type-writing machine, the combination with the flat platen and the main tracks or guides for the traveling machine, of a work-holder arranged over the platen, and carrying means located between the tracks or guides and over the platen for alining the sheet both laterally and longitudinally.

14. In a type-writing machine, the flat platen, and a work-holder arranged over the platen to position both a work-sheet and a carbon-sheet thereon, said work-holder having means for alining one of said sheets and means for guiding the other sheet.

15. In a type-writing machine, the flat platen, and a work-holder arranged over the platen and having means for supporting the edges of a shiftable carbon-web, and also having means for alining the work.

16. In a type-writing machine, the flat platen, and a work-holder arranged over the platen and having means for supporting the edges of a shiftable carbon-web, and also having means for both supporting and alining the work.

17. In a type-writing machine, a work-holder consisting of an open frame adapted to occupy a position beneath the printing mechanism, and movable away from the writing-surface, said frame being provided with means for holding in operative relation the sheet to be printed upon and the carbon element.

18. In a type-writing machine, a work-holding frame comprising a pair of oppositely-located open frame members, projecting inwardly from the opposite side portions of the platen and movable away from the writing-surface of the latter.

19. In a type-writing machine, a work-holding frame comprising a pair of frame members projecting inwardly from the opposite sides of the platen, and means for automatically operating said work-holder.

20. In a type-writing machine, the flat platen, a work-holder comprising a pair of vertically-movable frame members, each having means for supporting one edge of a carbon-web, and means for automatically elevating the work-holder when the machine is not arranged thereover.

21. In a type-writing machine, the flat platen, a work-holder comprising a pair of suitably-supported vertically-movable frame members arranged over the platen at opposite side portions thereof, each of said frame members having means for supporting an edge of a carbon-web, and means for automatically elevating the holding frame members above the platen when the machine is not arranged thereover.

22. In a type-writing machine, a work-holder comprising a pair of open frame members arranged over the platen at opposite sides thereof, one of said frame members having means for supporting and alining a sheet.

23. In a type-writing machine, a work-holder comprising a pair of open frame members arranged over the platen at opposite side portions thereof, one of said frame members having means for supporting and alining a sheet, and both of the same being adapted to support the edges of a copying-web.

24. In a type-writing machine, a work-holder comprising a pair of oppositely-located frame members arranged over the platen at opposite side portions thereof, both of said frame members being provided with strips to support the edge of the copying-web, and one of said frame members having means for alining the sheet.

25. In a type-writing machine, the work-holder comprising a pair of oppositely-located frame members arranged over the platen respectively at opposite side portions thereof, both of said frame members being provided with longitudinally-disposed strips to support the edges of a copying-web, and one of said frame members having means for alining a sheet.

26. In a type-writing machine, a work-holder comprising a support, an alinement-guide for the work-sheet, and means for supporting the edge of a carbon-web.

27. In a type-writing machine, a work-holder comprising a guide-strip adapted to support the edge of a carbon-sheet and forming an abutment for the folded edge or bight of the bill or work sheet, and alinement-guides for guiding the work-sheet to its properly-alined position on the guide-strip.

28. In a type-writing machine, a work-holder comprising a guide-strip, and a laterally-disposed alinement-guide bearing an angular relation to the guide-strip.

29. In a type-writing machine, a work-holder comprising a pair of oppositely-located open frame members arranged over the platen at opposite side portions thereof, and disposed longitudinally of the same, one of said holding frame members being provided with a longitudinal strip having a support for one edge of a carbon-web, and the other frame member being provided with a longitudinal guide-strip for the opposite side of the carbon-web, and also provided with alinement-guides.

30. In a type-writing machine, a work-holder comprising a pair of oppositely-located frame members arranged over the platen, each of said frame members being provided with a longitudinally-grooved guide-strip for the support of the opposite edges of a carbon-web, one of said grooves being deeper than the other to form a comparatively wide supporting-ledge for one side of the carbon.

31. In a type-writing machine, a work-holder comprising a pair of oppositely-located frame members, each of said members being provided with a longitudinally-grooved guide-strip, and alinement-guides extending laterally from one of said guide-strips.

32. In a type-writing machine, the flat platen, the main tracks or guides for the support of the printing mechanism, a work-holder comprising vertically-movable open frame members arranged over the platen at opposite sides thereof between the tracks or guides, and means for elevating said members.

33. In a type-writing machine, the combination with the rails or guides, of a work-holder comprising a support for the sheet, and an alinement-guide longitudinally disposed between the rails for guiding the sheet to its properly-alined position upon the support.

34. In a type-writing machine, the flat platen, a work-holder disposed thereover, and a vertically-movable automatically-actuated support for said work-holder.

35. In a type-writing machine, the flat platen, a movable work-holder provided with holding means for both a work-sheet and a carbon-sheet, and means for urging the said work-holder, when unrestrained, to its elevated position.

36. In a type-writing machine, the flat platen, a movable work-holder provided with holding means for both a work-sheet and a carbon-sheet, means for urging the work-holder away from the platen, and means for retaining the work-holder in opposition to said first-named means.

37. In a type-writing machine, the flat platen, the main tracks or guides for the traveling printing mechanism, a work-holder comprising open frame members arranged over the platen at opposite sides thereof between the tracks or guides, vertically-movable supports for the frame members to move the latter away from the platen, and means for elevating said supports.

38. In a type-writing machine, the flat platen, a work-holder comprising open frame members arranged over the platen at opposite sides thereof, vertically-movable supports for the frame members, and means for automatically elevating said supports when not depressed by the weight of the machine thereon.

39. In a type-writing machine, the stationary platen, movable rails for the type-carriage frame, and spring-actuated means for moving the rails.

40. In a type-writing machine, the stationary platen, movable rails thereon, and means for automatically moving said rails.

41. In a type-writing machine, the stationary platen, rails mounted to swing thereover, and means for automatically swinging the rails away from the platen.

42. In a type-writing machine, the stationary platen, swinging rails supported thereby and designed to support the machine-frame, and means for automatically elevating the rails when not depressed by the weight of the machine thereon.

43. In a type-writing machine, the stationary platen, rails movable toward and away from the writing-surface thereof, means for elevating said rails, and means for locking the rails to the platen.

44. In a type-writing machine, the stationary platen, swinging rails thereon, means constantly exerting a force tending to elevate the rails, and means carried by the platen to engage and retain the rails in their depressed position.

45. In a type-writing machine, a stationary platen, movable rails thereon, a work-holder carried by and movable with one of the rails and arranged over the platen, and means for moving said rails.

46. In a type-writing machine, the stationary flat platen, vertically-movable rails for the machine, said rails carrying holders for the work, and means for automatically elevating the said rails and the attached parts.

47. In a type-writing machine, the stationary flat platen, vertically-movable rails for the machine-frame, said rails carrying holders for the work, and means for automatically elevating said rails.

48. In a type-writing machine, the stationary platen, swinging rails arranged over the platen and adapted to be depressed by the weight of the machine thereon, a work-holder carried by the swinging rails, and means for automatically elevating the said rails.

49. In a type-writing machine, the stationary flat platen, hinged track-rails for the type-carriage frame, and means for automatically causing the elevation of the track-rails when the type-carriage frame moves back past their hinges.

50. In a type-writing machine, the stationary flat platen, swinging rails for the type-carriage frame arranged over the platen and hinged at one end, a work-holder fitted to and carried by said swinging rails, and means for automatically causing the elevation of the swinging rails, and their attached parts, when the traveling type-carriage frame moves past the hinge-joints.

51. In a type-writing machine, the stationary flat platen, hinged track-rails for the type-carriage frame, and track-rail-elevating means located in advance of said hinges.

52. In a type-writing machine, the stationary flat platen, hinged track-rails, and lifting devices working against the under sides of the rails.

53. In a type-writing machine, the stationary platen, hinged track-rails, lifting-arms engaging said rails, and means for operating the arms.

54. In a type-writing machine, the stationary platen, hinged track-rails, a spring-actuated rock-shaft supported by the platen, and lifting-arms operated by the rock-shaft and engaging the rails to effect their elevation.

55. In a type-writing machine, the stationary platen, hinged track-rails, lifting-arms engaging the rails, and reactive mechanism for automatically operating the arms to elevate the rails when said rails are relieved of the weight of the machine.

56. In a type-writing machine, the flat platen, the swinging track-rails having a hinge-support at one end, a work-holder carried by the swinging rails, a spring-actuated rock-shaft supported by the platen, and lifting-arms fitted to the ends of the rock-shaft and working against the under sides of the rails to provide for the automatic elevation thereof when relieved from the weight of the machine.

57. In a type-writing machine, the flat platen, and an automatically-operated work-gage disposed thereon and movable toward and away from the platen.

58. In a type-writing machine, the flat platen, tracks movable toward and away from the platen, and a work-gage carried by and movable with one of said tracks, and arranged at one side of the same.

59. In a type-writing machine, the flat platen, tracks movable toward and away from the platen, a work-gage carried by and movable with one of said tracks, and means for automatically elevating the tracks when the weight of the machine is removed therefrom.

60. In a type-writing machine, the flat platen, tracks movable toward and away from the platen, and a gage-abutment disposed longitudinally of the platen, beyond one side of a track and movable therewith.

61. In a type-writing machine, the flat platen, tracks movable toward and away from the platen, a gage-plate secured to a rail and disposed parallel therewith to cover the edge of the work, and a gage-abutment extending from the under side of the gage-plate to engage the work and enter the platen.

62. In a type-writing machine, the flat platen, a gage-plate movable toward and away from the platen, and a work-gage carried by the gage-plate to assist in the alinement and retention of the work.

63. In a type-writing machine, the flat platen, a work-holder and a work-gage, both of which are movable toward and away from the platen, and means for automatically elevating the holder and gage simultaneously.

64. In a type-writing machine, the flat platen, a work-holder arranged to engage the folded edge of the work sheet or bill, and a work-gage disposed to engage the extended edge of said sheet or bill.

65. In a type-writing machine, the flat platen, a work-holder arranged to engage the folded edge of the work sheet or bill, a work-gage disposed to engage the extended edge of said sheet or bill, and means for elevating the work-holder and gage simultaneously.

66. In a type-writing machine, a flat platen, movable tracks designed to support the type-carriage frame, a work-holding frame carried by the tracks, and a work-gage carried by one of said tracks.

67. In a type-writing machine, the flat platen, swinging tracks, a work-holding frame and a work-gage, both of which are carried by and movable with the tracks, and means for elevating said tracks.

68. In a type-writing machine, the flat platen, a work-holder arranged over the platen, and a traveling machine-frame disposed to retain the work-holder in position and having a slidable interlocking connection with the platen to prevent upward displacement of the work-holder from the platen.

69. In a type-writing machine, the flat platen, the movable tracks for the machine arranged over the platen, and the traveling machine-frame working on said tracks and having a slidable interlocking connection with the platen.

70. In a type-writing machine, the flat platen provided with guard-rails, the tracks having vertically-movable sections carrying work-holders, the traveling machine-frame working on the tracks and having a slidable interlocking connection with the guard-rails, and a lock adapted to secure the swinging track-sections flat upon the platen, and also adapted to be arranged in an interfering position to constitute a front stop for the traveling machine-frame.

71. In a type-writing machine, a work-carrying frame adapted to occupy a position beneath the printing mechanism, and movable away from the writing-surface, and a lock for holding said work-carrying frame in position upon the writing-surface, and against vertical movement therefrom.

72. In a type-writing machine, a swinging work-carrying frame adapted to occupy a position beneath the printing mechanism and movable to and from the writing-surface of the platen, and a lock for fastening the work-carrying frame upon the writing-surface and against vertical movement therefrom.

73. In a type-writing machine, a vertically-swinging work-carrying frame supported over the platen and movable to and from the writing-surface thereof, and a lock for fastening the work-carrying frame in its depressed position.

74. In a type-writing machine, the flat platen, the traveling machine-frame, a vertically-swinging work-holding frame, and a lock for holding the work-holding frame in its depressed position, said lock also having means for arresting the forward movement of the traveling machine-frame.

75. In a type-writing machine, the flat platen, the vertically-movable tracks carrying work-holders, the traveling machine-frame working on the tracks, a lock arranged at the front end of the platen and having a locking-hook adapted to engage with one of the movable track-sections to hold both of said sections flat upon the platen, said locking-hook being also adapted to constitute a stop for the forward movement of the traveling machine-frame, and means for holding the lock in either of its adjusted positions.

76. In a type-writing machine, the flat platen, a vertically-movable work-holder, and oppositely-arranged winding-spools supporting a carbon-web arranged over the platen, said work-holder having guiding means for an edge of the carbon-web.

77. In a type-writing machine, the flat platen to sustain the sheet, a movable work-holder arranged thereover, and carriers supporting a carbon-web, one of said carriers being movable with the work-holder.

78. In a type-writing machine, the flat platen to sustain the sheet, a vertically-movable work-holding frame, and carriers for the carbon-web supported respectively by the platen and by the vertically-movable frame.

79. In a type-writing machine, the flat platen to sustain the sheet, a swinging work-holder, and carriers supporting a carbon-web, one of said carriers being carried at the free end of the work-holder for movement therewith.

80. In a type-writing machine, the flat platen to sustain the sheet, a vertically-swinging machine-supporting frame carrying holders for the work, and oppositely-located spools for the carbon-web, one of said spools being supported by the vertically-swinging frame and the other spool being supported by a relatively fixed part.

81. In a type-writing machine, the flat platen, the vertically-swinging machine-supporting frame supported on the platen and carrying holders for the work, said frame being provided contiguous to its front end with a fixed pendent bearing and with a bearing member or block having an open bearing-notch, and spools for the carbon-web, the rear spool being supported by the platen in rear of the movable frame, and the front spool having its spindle extremities journaled respectively in the bearing members.

82. In a type-writing machine, the flat platen provided therein with a spool-pocket, bearings arranged therein, a vertically-movable machine-supporting frame carrying holders for the work, and also carrying bearings at the front end thereof, and front and rear spools for the carbon-web, the spindle extremities of the rear spool being detachably journaled in the bearings within said spool-pocket, and the spindle extremities of the front spool being removably mounted in the bearings at the front end of the frame.

83. In a type-writing machine, the combination of the flat platen to sustain the sheet to be written on, tracks or guides for the traveling machine, a vertically-movable frame disposed above the platen between the tracks or guides, and a carbon-carrier movable with said frame.

84. The combination with a flat platen, a vertically-movable frame, printing mechanism mounted to travel on said frame, and a carbon-carrier operated by said frame.

85. The combination with a flat platen, a vertically-movable frame, writing mechanism mounted to travel over the platen, and a carbon-carrier attached to the frame and movable therewith.

86. In a type-writing machine, the combination of a flat platen, tracks or guides for the traveling machine, a vertically-movable work-holder arranged above the platen, and a carbon-carrier attached to said work-holder and movable therewith.

87. In a type-writing machine, the combination of the flat platen, a swinging work-holder provided with means for supporting a carbon-web, and carriers for said web, one of said carriers being carried by the work-holder at the front end thereof.

88. In a type-writing machine, the combination with the platen, and means for supporting a folded sheet thereover, of independent means for supporting a carbon element disposed between the folded portions of the sheet.

89. In a type-writing machine, the combination of the platen, the paper-confining frame hinged at one end and sustaining the writing mechanism, and a rock-shaft provided with means for raising and sustaining the frame when raised.

90. In a type-writing machine, the combination of a flat platen, a hinged top frame located above the platen and sustaining and guiding the movable writing mechanism in its line-spacing movement, a relatively narrow carbon-sheet extended lengthwise of the hinged frame and sustained thereby at the ends, and a guard also sustained by said frame and extending along the edge of the carbon-sheet.

91. In a type-writing machine, the flat bed or platen, the hinged top frame whereon the writing mechanism is mounted for movement in the direction of line-spacing and by which said writing mechanism is guided, a carbon-sheet extended lengthwise of and sustained by the said frame, and two bars or guards also carried by the frame and extending along the edge of the carbon.

92. In a type-writing machine and in combination with the bed or platen and a hinged frame, a carbon-sheet extending lengthwise of and sustained by the said frame, and a guard arranged to embrace the edge of the carbon-sheet.

93. In combination, a platen, tracks or guides for the traveling machine, a transfer element disposed thereover and normally lying closely adjacent to the surface thereof, and reactive means tending to separate said element from the platen but normally ineffective.

94. In combination, a platen, tracks or guides for the traveling machine, a transfer element normally lying closely adjacent to the writing-surface of the platen, and automatic means for effecting relative movement of the transfer element and platen to separate the same.

95. In combination, a platen, tracks or guides for the traveling machine, and a transfer element, means for normally retaining the same in adjacent relation, and means for moving the transfer element away from the platen.

96. In combination, a platen, tracks or guides for the traveling machine, a transfer element normally lying close against a subjacent sheet, and a spring tending to move the transfer element away from the platen.

97. In combination, a platen, tracks or guides for the traveling machine, a transfer-web, retaining devices for the opposite ends of the web, said devices being stationary during the recording operation, and means for moving one of said devices to separate the web from the platen.

98. In combination, a platen, tracks or guides for the traveling machine, a transfer-web, retaining devices for said web, said devices being stationary during the operation of recording, and reactive means tending to move one of said devices.

99. In combination, a platen, tracks or guides for the traveling machine, a transfer-web, retaining devices therefor, and a spring for moving one of said devices to effect the lateral separation of the web from the platen, said devices being stationary during the recording operation and normally retaining the transfer-web close against a subjacent record-sheet supported by the platen.

100. In combination, a platen, type-writing mechanism, an inking-ribbon therefor, a spring-actuated carbon-carrying device and a carbon carried by said device.

101. In combination, a platen, tracks or guides for the traveling machine, a carbon element, and a spring-actuated latch-controlled carbon-engaging device normally retaining the carbon element close against a subjacent record leaf or sheet.

102. In combination, a platen, tracks or guides for the traveling machine, and a spring-elevated latch-controlled carbon-carrier.

103. In combination, a flat platen, a device movable to separate the transfer element from the platen, tracks or guides for the traveling machine, a transfer element disposed over the platen between the tracks or guides, and means for automatically moving said device.

104. In combination, a platen, tracks or guides for the traveling machine, a holding device for a transfer element, means for locking said device in its normal depressed position, and means for automatically raising said device when unlocked.

105. In combination, a platen, tracks or guides for the traveling machine, a rotary carbon-carrier, and means for moving said carrier bodily to separate the carbon from the platen.

106. In combination, a platen, tracks or guides for the traveling machine, a carrier located beyond and parallel with one edge of the platen, and automatic means for elevating the carrier.

107. In combination, a flat platen, tracks or guides for the traveling machine, a transfer element disposed over the platen, means, including a rotary carrier, for retaining the ends of the transfer element, and automatic means for moving said carrier to separate the transfer element from the platen.

108. In combination, a flat platen, tracks or guides for the traveling machine, and a carbon-carrier at one edge of the platen and vertically movable with respect thereto.

109. In a type-writer, the combination with a flat platen to support the sheet to be written on, of a vertically-movable top frame, a type-writing machine mounted to travel thereon, and a carbon-carrier attached to the top frame and movable therewith.

110. In a type-writer, the combination with a platen and machine-supporting means including a vertically-movable track or guide, of a carbon-carrier movable relative to the platen with said track or guide and disposed at one edge of the platen.

111. In a type-writer, the combination with a flat platen, tracks or guides and a traveling machine, of a transfer element disposed over the platen, and automatic means for raising the same.

112. In a type-writer, the combination with a flat platen, a traveling machine, and machine-supporting means including a movable track or guide, of a transfer element, and automatic means for simultaneously moving the transfer element and the movable track or guide.

113. In a type-writer, the combination with a flat platen, of a vertically-movable machine-supporting frame, a support rigid therewith, a carbon element on the support and a type-writing mechanism mounted to travel on the machine-supporting frame.

114. The combination with a flat platen and tracks or guides for the traveling machine, of a transfer element arranged to swing independently of the platen from an axis disposed transversely of said platen.

115. The combination with a platen and tracks or guides for the traveling machine, of a transfer element normally lying close to the platen and arranged to swing independently of the platen from an axis disposed transversely thereof, and means for swinging said element.

116. In a manifolding device, the combination with a platen, tracks or guides for the traveling machine, and a transfer element mounted to swing over the platen, of automatic means for swinging said element away from the platen.

117. In a manifolding device, the combination with a platen and tracks or guides for the traveling machine, of an automatically-operated swinging transfer element and a latch therefor.

118. In a manifolding device, the combination with a platen and tracks or guides for the traveling machine, of a transfer element disposed over the platen between the tracks or guides, and a spring tending to swing the transfer element away from the platen.

119. In a type-writer, the combination with a platen, and tracks or guides and a traveling machine, of reactive means tending to move a track or guide away from the platen, and a carbon element movable with said track or guide.

120. In a manifolding device, the combination with a flat platen and tracks or guides for the traveling machine, of a transfer element disposed over the platen and normally lying closely adjacent thereto, means for feeding said element to displace the used portions thereof, and means for moving said element away from the platen to facilitate the manipulation of the work.

121. In a manifolding device, the combination with a flat platen and tracks or guides for the traveling machine, of a transfer element disposed over the platen, means for feeding the transfer element to displace the used portions thereof, and automatic means for moving the transfer element away from the platen to facilitate the manipulation of the work.

122. In a type-writing machine, the combination with a flat platen and a machine-supporting frame, of a work holding or guarding member disposed longitudinally over the platen between the sides of the frame and adapted to constitute an abutment for the fold or bight of a folded bill-form, and automatic means for moving said member.

123. In a type-writing machine, the combination with a flat platen, of a movable track or guide, a work holding or guarding member disposed parallel with but spaced from said track or guide and movable therewith, and automatic means for moving said track or guide away from the platen.

124. In a type-writing machine, the combination with a flat platen, an open machine-supporting frame, automatic means for elevating said frame, and a work holding or guarding member disposed longitudinally of the platen and connected to the machine - supporting frame, but spaced from the side members thereof.

125. In a type-writing machine, the combination with a flat platen and the main tracks or guides movable toward and away from the plane of the platen, of a carbon - guarding member disposed longitudinally of the platen between the tracks or guides for movement therewith.

126. In a type-writing machine, the combination with a flat platen and the tracks or guides hinged to and movable toward and away from the platen, of work-guarding members disposed longitudinally and transversely over the platen and connected to the tracks or guides for movement therewith.

127. In a type-writing machine, the combination with a flat platen and the tracks or guides, of work-guarding members disposed longitudinally and transversely over the platen between the tracks or guides, and automatic means for moving said members away from the platen.

128. In a type-writing machine, the combination with a flat platen and a movable machine-supporting frame, of transfer means and paper-clamping means both carried by said frame.

129. The combination with a flat platen, tracks or guides for the traveling machine, and a vertically-movable frame, of a carbon-carrier and a work-holder both carried by the frame.

130. In a manifolding device, the combination with a flat platen, of a longitudinal strip or bar disposed thereover to form an abutment for the folded edge or bight of a work-sheet, and carbon-carriers disposed transverse to said strip to retain a carbon element interposed between the upper and lower portions of the work-sheet.

131. In combination, a platen, tracks or guides for the traveling machine, work-confining means, and a vertically-movable transfer element extended over the platen between the tracks or guides.

132. In a type-writer, a flat platen, a machine-supporting frame, type-writing mechanism mounted to travel on said frame, a carbon element, and a guard disposed opposite one edge of said element.

133. In a type-writing machine, a flat platen, a machine-supporting frame, type-writing mechanism mounted to travel on said frame, a transfer element, and guards disposed along the opposite edges of said element.

134. In combination, a flat platen, tracks or guides for the traveling machine, a transfer element disposed longitudinally over the platen, and a guard for one longitudinal edge of the transfer element, the transfer element and guard being movable away from the platen in unison.

135. In a type-writing machine, the flat platen, and the work-holder arranged over the platen and provided with holding means for the sheet to be printed upon and guiding means for a carbon element or web.

136. In a type-writing machine, the flat platen, and the work-holder arranged over the platen and provided with means for holding the work-sheet and forming a guard for a shiftable carbon-web.

137. In a type-writing machine, the flat platen, and a work-holder arranged over the platen and having means for holding a folded sheet with the separate leaves thereof disposed above and below a carbon element or web.

138. In a type-writing machine, the platen, and a guide for the edge of a carbon-sheet, said guide being disposed to form an abutment for the folded edge or bight of the bill or work sheet.

139. In a type-writing machine, the platen, and a guard for the edge of a carbon-sheet, said guard being disposed to form an abutment for the folded edge or bight of the bill or work sheet.

140. In a type-writing machine, the flat platen, in combination with a longitudinal support mounted thereover to engage and support the side edge of a carbon element or web.

141. In a type-writing machine, the flat platen, in combination with a holder for a folded bill-form, said holder being provided with an abutment for the folded edge or bight of said form.

142. In a type-writing machine, the platen, and an automatically-movable support for a longitudinal edge of a carbon sheet or web.

143. In a type-writing machine, the work-holder adapted to occupy a position beneath the printing mechanism and movable from the writing-surface, said work-holder being provided with holding means for the sheet to be printed upon, and guiding means for a carbon element or web.

144. In a type-writing machine, a work-holder adapted to occupy a position beneath the printing mechanism and movable to and from the writing-surface, said work-holder being provided with means for holding in operative relation the sheet to be printed upon with respect to a carbon element or web and forming a guard for the latter.

145. In a type-writing machine, the flat platen, in combination with a work-holder constructed to permit the traveling machine to pass thereover, and provided with means for holding the sheet to be written upon in proper relation with a carbon element or web, and also having means to engage the sheet at the top and bottom edges for laterally alining the same.

146. In a type-writing machine, the flat platen, in combination with means mounted thereover and coöperating therewith for supporting, guiding and guarding the side edge of a carbon element or web.

147. In a type-writing machine, the flat platen, in combination with means mounted thereover and coöperating therewith for supporting, guiding and guarding both side edges of a carbon element or web.

148. In a type-writing machine, tracks or guides for the traveling machine, the flat platen, in combination with means mounted thereover and coöperating therewith and constituting an automatically-operated carrier for a carbon element or web.

149. In a type-writing machine, the flat platen, in combination with a longitudinal strip mounted thereover and provided with a groove for receiving one edge of a transfer element or web.

150. In a type-writing machine, the flat platen, in combination with a longitudinal strip or bar mounted thereover and constituting a guard for a carbon element or web, and an abutment for the work-sheet, and also retaining the latter in proper relation with the former for manifolding.

151. In a type-writing machine, the flat platen, and a work-holder arranged over the platen and having means for supporting the edges of a shiftable carbon-web.

152. In a type-writing machine, the platen, a work-holder comprising a pair of vertically-movable frame members, each having means for supporting one edge of a carbon-web.

153. In a type-writing machine, the work-holder comprising a pair of oppositely-located frame members arranged over the platen at opposite side portions thereof, both of said frame members being provided with strips to support the edge of the carbon-web.

154. In a type-writing machine, a work-holder comprising a support, an alinement-guide for the work-sheet, and means for guiding the edge of a carbon-web.

155. In a type-writing machine, a work-holder comprising a longitudinal guide-strip adapted to receive the edge of a carbon-sheet and forming an abutment for the work-sheet.

156. In a type-writing machine, the flat platen, movable rails thereon, and a work-holder arranged over the platen between the rails and operated in unison therewith and means for moving the rails.

157. In a type-writing machine, the flat platen, vertically-swinging rails mounted thereover, and a work-holder carried by the rails in their movement and arranged over the platen between the rails and means for swinging the rails.

158. In a type-writing machine, the flat platen, vertically-movable rails for the machine, said rails carrying holders for the work and means for elevating the rails.

159. In a type-writing machine, the flat platen, movable rails thereon, means for automatically moving said rails, and a work-holder operated in unison with the rails.

160. In a type-writing machine, the flat platen, tracks movable toward and away from the platen, and a gage-plate secured to a track and disposed parallel therewith to cover the edge of the work and having an abutment for said edge.

161. In a type-writing machine, the flat platen, the tracks or guides, and a work-holder and a work-gage, both of which are movable toward and away from the platen in unison.

162. In a type-writing machine, the flat platen provided with guard-rails, the tracks having vertically-movable sections, the traveling-machine frame working on the tracks and having a slidable interlocking connection with the guard-rails, and a lock adapted to secure the swinging track-sections flat upon the platen, and also adapted to be arranged in an interfering position to constitute a front stop for the traveling-machine frame.

163. In a type-writing machine, the flat platen to sustain the sheet, a vertically-swinging machine-supporting frame, and oppositely-located spools for the carbon-web, said spools being respectively supported by the vertically-swinging frame and by a relatively fixed part.

164. In a type-writing machine, the combination with the platen, and means for supporting a folded sheet thereover, of independent means for supporting a carbon element disposed between the folded portions of the sheet, said supporting means for the folded sheet and carbon being constructed to carry the carbon element and sheet away from the platen.

165. In a type-writer, the combination with a platen and machine-supporting means including a vertically-movable track or guide, of a carbon-carrier movable relative to the platen with said track or guide.

166. In a type-writing machine, the combination with a flat platen, and a movable track or guide, of a carbon-guarding member disposed longitudinally over the platen, and movable with said track or guide.

167. In a type-writing machine, the combination with a flat platen, and a vertically-movable machine-supporting frame, of transfer means and paper-carrying means both movable away from the platen by the said frame.

168. In a type-writing machine, the combination with a flat platen, a work-confining device thereon, and reactive means for elevating said device and sustaining the same in an elevated position independent of the operation of the machine.

169. The combination with a flat platen, of a carbon-sheet disposed over the platen at right angles to a paper-sheet, and a work-holding frame adapted to hold the paper-sheet and the carbon-web in operative relation during the printing operation.

170. In a type-writing machine, the combination with a bed or platen and a hinged frame, of a carbon-sheet extending lengthwise of and sustained by said frame, and a guard arranged to support the edge of the carbon-sheet.

171. In a type-writing machine, the combination with a flat platen and the machine-supporting frame, of a work holding and guarding member disposed longitudinally over the platen between the sides of the frame and adapted to constitute an abutment for the fold or bight of a folded bill-form.

172. In a type-writing machine, the combination with a flat platen and the tracks or guides, of work-guarding members disposed longitudinally and transversely over the platen between the tracks or guides, and means for moving said members away from the platen.

173. In a manifolding device, the combination with a flat platen, of a longitudinal strip or bar disposed thereover to form an abutment for the folded edge or bight of a work-sheet, and devices disposed transverse to the said strip to retain a carbon element interposed between the upper and lower portions of the work-sheet.

174. In a type-writing machine, the flat platen, the tracks or guides, a work-holder and a work-gage, and means for elevating both the work-holder and work-gage.

175. In a type-writing machine, the flat platen to sustain the sheet, a vertically-swinging machine-supporting frame, and spaced retaining devices for the carbon-web, one of said devices being carried by the vertically-swinging frame and the other by a relatively fixed part.

176. In combination, a flat platen, tracks or guides, a traveling type-writing machine, a transfer-web disposed over the writing-surface of the platen between the tracks or guides, devices disposed transverse to the web beyond opposite limits of the printing area and retaining said web, and means for effecting relative movement of the web and platen to separate the same and thus facilitate the manipulation of an interposed record leaf or sheet.

177. In combination, a flat platen, tracks or guides, a traveling type-writing machine, a transfer-web disposed over the writing-surface of the platen between the tracks or guides, separate devices arranged transverse to the web beyond opposite limits of the printing area and retaining said web, one of said devices being vertically movable independently of the other to permit the separation of the web from the platen.

178. In combination, a flat platen, tracks or guides, a traveling type-writing machine, a transfer-web disposed over the platen, separate devices located beyond opposite limits of the printing area and normally retaining the web in closely adjacent relation to the platen or to a record leaf or sheet supported thereby, one of said devices constituting a support for the transfer-web, and means for raising one of the web-retaining devices to separate the transfer-web from the platen and thus facilitate the manipulation of the record leaf or sheet.

179. In combination, a flat platen, tracks or guides, a traveling type-writing machine, a carbon-roll disposed transversely of the platen in rear of the printing area, a vertically-movable retaining device disposed transversely of the platen in advance of the printing area and retaining the carbon-web extending over the platen from the roll, and means for raising said device to separate the web from the platen.

180. In combination, a flat platen and a type-writing machine, relatively movable for line and letter spacing, a work-holding member disposed longitudinally of the platen, and a carbon-retaining device disposed transversely of the platen, said work-holder and said retaining device being vertically movable in unison with respect to the platen.

181. In combination, a flat platen and a type-writing machine, relatively movable for line and letter spacing, a transfer-web extending longitudinally over the platen, transverse web-retaining devices beyond opposite limits of the printing area, a work-holder disposed longitudinally of the platen, and means for simultaneously elevating the work-holder and one of the web-retaining devices to release the work and to separate the transfer-web from the platen.

182. In combination, a flat platen, tracks or guides, a traveling type-writing machine, a transfer-web disposed longitudinally over the platen, a work-clamp extending along one side edge of the platen, and a web-retaining device extending across the front edge of the platen, the clamp being vertically movable to release the work and the web-retaining device being also vertically movable to separate the web from the platen.

183. In combination, a flat platen, tracks or guides, a traveling type-writing machine, a transfer-web disposed longitudinally over the platen, a work-clamp extending along one side edge of the platen, a web-retaining device extending across the front edge of the platen, and means for elevating both the work-clamp and the web-retaining device to release the work and to separate the web from the platen.

184. In combination, a flat platen, tracks or guides, a traveling type-writing machine, a carbon-roll in rear of the printing area, a web extending over the platen from said roll, a web-retaining device disposed across the front edge of the platen, a work-clamp extending along one side edge of the platen, and means for elevating both the work-clamp and the web-retaining device to release the work and to separate the carbon-web from the platen.

185. In combination, a flat platen, tracks or guides, a traveling type-writing machine, a transfer-web extended over the platen, a web-retaining device disposed transversely of the platen, a work-holder disposed longitudinally of the platen and having connection with the web-retaining device, said work-holder and retaining device being movable to release the work and to separate the transfer-web from the platen.

186. In combination, a flat platen, tracks or guides and a traveling type-writing machine, a carbon-web disposed over the platen, and a web-retaining device and a work-holder arranged at right angles to each other and connected for interdependent movement with respect to the platen.

187. In combination, a flat platen, tracks or guides and a traveling type-writing machine, a carbon-web disposed over the platen, a web-retaining device and a work-holder arranged at right angles to each other and connected for interdependent movement with respect to the platen, and a spring for moving the work-holder and the web-retaining device in one direction.

In testimony that we claim the foregoing as our own we have hereto affixed our signatures in the presence of two witnesses.

RALPH D. STACKPOLE.
CHARLES FREDERICK LAGANKE.

Witnesses to the signature of Ralph D. Stackpole:
J. H. WILSON,
D. E. MCCABE.

Witnesses to the signature of Charles F. Laganke:
ALBERT E. FEIHL,
J. MAYER.